United States Patent [19]
Jennings et al.

[11] Patent Number: 5,633,109
[45] Date of Patent: May 27, 1997

[54] INK COMPOSITIONS WITH LIPOSOMES CONTAINING PHOTOCHROMIC COMPOUNDS

[75] Inventors: Carol A. Jennings, Etobicoke; Marcel P. Breton; MaryAnna Isabella, both of Mississauga, all of Canada; Eric G. Johnson, Plant City, Fla.; Trevor I. Martin, Burlington; John F. Oliver, Calgary, both of Canada

[73] Assignee: Xerox Corporation, Stamford, Conn.

[21] Appl. No.: 567,637

[22] Filed: Dec. 5, 1995

[51] Int. Cl.⁶ ............................ C09D 11/06; G03G 9/135
[52] U.S. Cl. .................. 430/115; 106/31.21; 106/31.32; 106/31.34; 106/31.47
[58] Field of Search ............................ 430/112, 115; 428/704, 411.1; 106/20 D, 22

[56] References Cited

U.S. PATENT DOCUMENTS

| | | | |
|---|---|---|---|
| 4,783,220 | 11/1988 | Gamble et al. | 106/27 |
| 4,877,451 | 10/1989 | Winnik et al. | 106/23 |
| 4,880,432 | 11/1989 | Egan et al. | 8/647 |
| 4,973,519 | 11/1990 | Tortorici et al. | 428/411.1 |
| 5,051,779 | 9/1991 | Hikawa | 355/200 |
| 5,091,966 | 2/1992 | Bloomberg et al. | 382/21 |
| 5,128,525 | 7/1992 | Stearns et al. | 235/454 |
| 5,145,518 | 9/1992 | Winnik et al. | 106/21 |
| 5,168,147 | 12/1992 | Bloomberg | 235/456 |
| 5,277,992 | 1/1994 | Shinohara et al. | 428/704 |
| 5,291,243 | 3/1994 | Heckman et al. | 355/201 |
| 5,337,361 | 8/1994 | Wang et al. | 380/51 |
| 5,378,574 | 1/1995 | Winnik et al. | 430/115 |

FOREIGN PATENT DOCUMENTS

| | | |
|---|---|---|
| 0459792 | 4/1991 | European Pat. Off. . |
| 0469864 | 5/1992 | European Pat. Off. . |

*Primary Examiner*—John Goodrow
*Attorney, Agent, or Firm*—Judith L. Byorick

[57] ABSTRACT

Disclosed is an ink composition which comprises an aqueous liquid vehicle, a photochromic material, and a vesicle-forming lipid, wherein vesicles of the lipid are present in the ink.

31 Claims, 1 Drawing Sheet

INK COMPOSITIONS WITH LIPOSOMES CONTAINING PHOTOCHROMIC COMPOUNDS

BACKGROUND OF THE INVENTION

The present invention is directed to ink compositions and printing processes. More specifically, the present invention is directed to ink compositions containing liposomes having therein a photochromic compound. One embodiment of the present invention is directed to an ink composition which comprises an aqueous liquid vehicle, a photochromic material, and a vesicle-forming lipid, wherein vesicles of the lipid are present in the ink.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described, for example, in U.S. Pat. No. 4,601,777, U.S. Pat. No. 4,251, 824, U.S. Pat. No. 4,410,899, U.S. Pat. No. 4,412,224, and U.S. Pat. No. 4,532,530, the disclosures of each of which are totally incorporated herein by reference.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Methods for encoding machine-readable information on documents, packages, machine parts, and the like, are known. One-dimensional symbologies, such as those employed in bar codes, are known. Two-dimensional symbologies generally are of two types-matrix codes and stacked bar codes. Matrix codes typically consist of a random checker board of black and white squares. Alignment features such as borders, bullseyes, start and stop bits, and the like, are included in the matrix to orient the matrix during scanning. Stacked bar codes consist of several one-dimensional bar codes stacked together. Two-dimensional symbologies have an advantage over one-dimensional symbologies of enabling greater data density. For example, a typical bar code can contain from about 9 to about 20 characters per inch, while a typical two-dimensional symbology can contain from about 100 to about 800 characters per square inch. Many two-dimensional symbologies also utilize error correction codes to increase their robustness. Examples of two-dimensional symbologies include PDF417, developed by Symbol Technologies, Inc., Data Matrix, developed by International Data Matrix, Vericode, developed by Veritec, Inc., CP Code, developed by Teiryo, Inc. and Integrated Motions, Inc., Maxicode, developed by the United Parcel Service, Softstrip, developed by Softstrip, Inc., Code One, developed by Laserlight Systems, Supercode, developed by Metanetics Inc., DataGlyph, developed by Xerox Corporation, and the like. One-dimensional and two-dimensional symbologies can be read with laser scanners or with video cameras. The scanners typically consist of an imaging detector coupled to a microprocessor for decoding. Scanners can be packaged into pen-like pointing devices or guns. Bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference.

European Pat. No. Application 469,864-A2 (Bloomberg et al.), the disclosure of which is totally incorporated herein by reference, discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system. Moreover, for at least some applications, the glyphs desirably are composed of printed pixel patterns containing nearly the same number of on pixels and nearly the same number of off pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes are also disclosed.

European Pat. No. Application 459,792-A2 (Zdybel et al.), the disclosure of which is totally incorporated herein by reference, discloses the provision in electronic document processing systems for printing unfiltered or filtered machine-readable digital representations of electronic documents, and human-readable renderings of them on the same record medium using the same printing process. The integration of machine-readable digital representations of electronic documents with the human-readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human-readable content of the hardcopy renderings. In addition to storage of the electronic representation of the document, provision is made for encoding information about the electronic representation of the document itself, such as file name, creation and modification dates, access and security information, and printing histories. Provision is also made for encoding information which is computed from the content of the document and other information, for purposes of authentication and verification of document integrity. Provision is also made for the encoding of information which relates to operations which are to be performed depending on handwritten marks made upon a hardcopy rendering of the document; for example, encoding instructions of what action is to be taken when a box on a document is checked. Provision is also made for encoding in the hardcopy another class of information; information about the rendering of the document specific to that hardcopy, which can include a numbered copy of that print, the identification of the machine which performed that print, the reproduction characteristics of the printer, and the screen frequency and rotation used by the printer in rendering halftones. Provision is also made for encoding information about the digital encoding mechanism itself, such as information given in standard-encoded headers about subsequently compressed or encrypted digital information.

U.S. Pat. No. 5,128,525 (Stearns et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,291,243 (Heckman et al.), the disclosure of which is totally incorporated herein by reference, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

U.S. Pat. No. 5,168,147 (Bloomberg), the disclosure of which is totally incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to herein as "errors") that are encountered during the decoding of such codes. A substantial portion of the image processing that is performed in the illustrated embodiment of the invention is carried out through the use of morphological filtering operations because of the parallelism that is offered by such operations. Moreover, the error detection that is performed in accordance with this invention may be linked to or compared against the error statistics from one or more alternative decoding process, such as the convolution filtering process that is disclosed herein, to increase the reliability of the decoding that is obtained.

U.S. Pat. No. 5,091,966 (Bloomberg et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,051,779 (Hikawa), the disclosure of which is totally incorporated herein by reference, discloses an image processing system which specifies input image information on the basis of existence of a special mark or patterns printed on a job control sheet. Selected one of various image processings is executed in accordance with the existence of the special mark or patterns to thereby obtain output image information. Each of the special marks or patterns are line drawings, each drawn so as to have a certain low correlative angle to the longitudinal and transverse directions of an image provided with the special mark or patterns.

U.S. Pat. No. 5,337,361 (Wang et al.), the disclosure of which is totally incorporated herein by reference, discloses a record which contains a graphic image and an information area which are interrelated to discourage misuse of the record. The information area can overlay the graphic image and include information encoded in an error-correctable, machine-readable format which allows recovery of the information despite distortion due to the underlying graphic image. The record may also represent the image by words similar in form to words in the information area. Both the information and graphic words can then be altered when an action regarding the record takes place.

Copending application U.S. Ser. No. 08/567,464, pending, filed concurrently herewith, entitled "Ink Compositions Containing Liposomes," with the named inventors Marcel P. Breton, Jaan Noolandi, Mary A. Isabella, Susanne Birkel, and Gordon K. Hamer, the disclosure of which is totally incorporated herein by reference, discloses an ink composition which comprises an aqueous liquid vehicle, a dye, and a vesicle-forming lipid, wherein vesicles of the lipid are present in the ink.

Copending application U.S. Ser. No 08/567,786, filed concurrently herewith, entitled "Method for Embedding and Recovering Machine-Readable Information," with the named inventors Trevor I. Martin and John F. Oliver, the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in the photochromic marking material from the first state to the second state.

Copending application U.S. Ser. No. 08/57,456 now U.S. Pat. No. 5,551,973, filed concurrently herewith, entitled "Photochromic Microemulsion Ink Compositions," with the named inventors John F. Oliver, Trevor I. Martin, Carol A. Jennings, Eric G. Johnson, and Marcel P. Breton, the disclosure of which is totally incorporated herein by reference, discloses an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

Copending application U.S. Ser. No. 08/567,589 pending, filed concurrently herewith, entitled "Photochromic Electrostatic Toner Compositions," with the named inventors Trevor I. Martin, Carol A. Jennings, Eric G. Johnson, and John F. Oliver, the disclosure of which is totally incorporated herein by reference, discloses a toner composition for the development of electrostatic latent images which comprises particles comprising a mixture of a resin and a photochromic material. Another embodiment of the invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the invention is directed to a liquid developer composition for the development of electrostatic latent images which comprises a nonaqueous liquid vehicle, a charge control agent, and toner particles comprising a mixture of a resin and a photochromic material.

Copending application U.S. Ser. No. 08/567,457 now U.S. Pat. No. 5,593,486, filed concurrently herewith, entitled "Photochromic Hot Melt Ink Compositions," with the named inventors John F. Oliver, Trevor I. Martin, Carol A. Jennings, Eric G. Johnson, and Stephan V. Drappel, the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, and (c) an optional propellant.

Although known compositions are suitable for their intended purposes, a need remains for ink compositions with photochromic characteristics. In addition, there is a need for aqueous photochromic ink compositions suitable for use in thermal ink jet printing processes. There is also a need for processes for preparing documents with images having photochromic characteristics. Further, there is a need for ink compositions which enable production of photochromic documents wherein the stimulus required to invoke the photochromic response is relatively brief rather than continuous. Additionally, there is a need for processes and materials which enable the placement of encoded information on documents which is not detectable to the reader but which is machine readable. There is also a need for aqueous photochromic ink compositions suitable for use in thermal ink jet printing processes wherein the ink contains a relatively large aqueous component and a relatively small organic component. Further, there is a need for aqueous photochromic ink compositions wherein the photochromic material is soluble in the ink vehicle and is also waterfast on the substrate upon which it is printed.

SUMMARY OF THE INVENTION

It is an object of the present invention to provide ink compositions with the above advantages.

It is another object of the present invention to provide ink compositions with photochromic characteristics.

It is yet another object of the present invention to provide aqueous photochromic ink compositions suitable for use in thermal ink jet printing processes.

It is still another object of the present invention to provide processes for preparing documents with images having photochromic characteristics.

Another object of the present invention is to provide ink compositions which enable production of photochromic documents wherein the stimulus required to invoke the photochromic response is relatively brief rather than continuous.

Yet another object of the present invention is to provide processes and materials which enable the placement of encoded information on documents which is not detectable to the reader but which is machine readable.

Still another object of the present invention is to provide aqueous photochromic ink compositions suitable for use in thermal ink jet printing processes wherein the ink contains a relatively large aqueous component and a relatively small organic component.

It is another object of the present invention to provide aqueous photochromic ink compositions wherein the photochromic material is soluble in the ink vehicle and is also waterfast on the substrate upon which it is printed.

These and other objects of the present invention (or specific embodiments thereof) can be achieved by providing an ink composition which comprises an aqueous liquid vehicle, a photochromic material, and a vesicle-forming lipid, wherein vesicles of the lipid are present in the ink.

DETAILED DESCRIPTION OF THE INVENTION

The ink compositions of the present invention comprise an aqueous liquid vehicle, a photochromic material, and a vesicle-forming lipid. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as butyl carbitol or cellusolve, amino alcohols, ketones, polyelectrolytes, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

Figure 1:
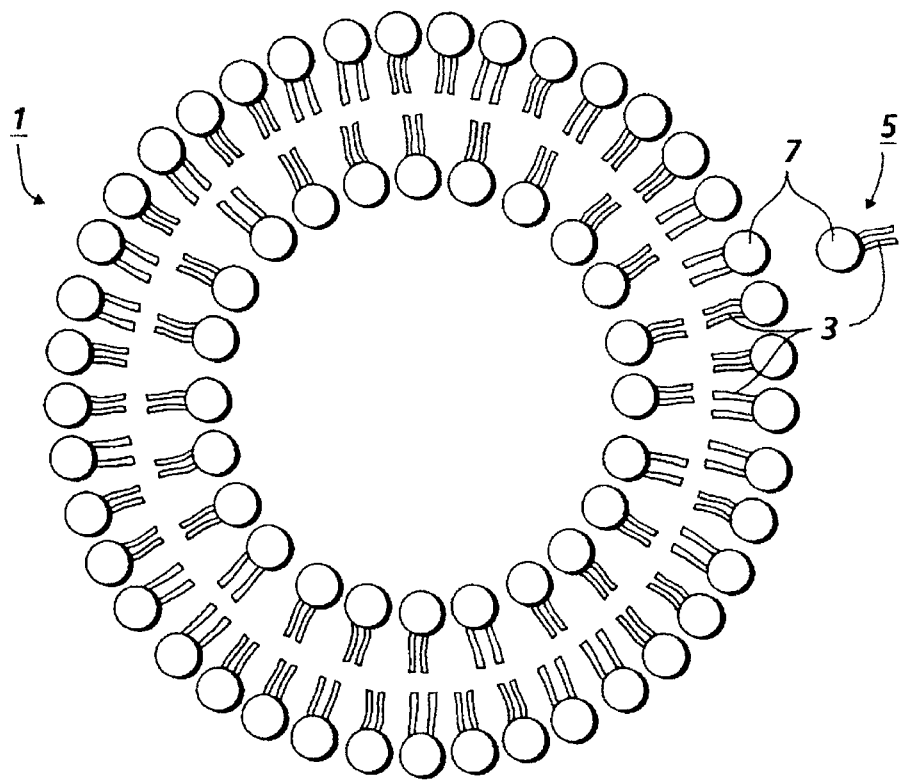
FIG. 1 illustrates schematically a liposome or vesicle having a single bilayered membrane in an aqueous ink of the present invention.
Figure 2:
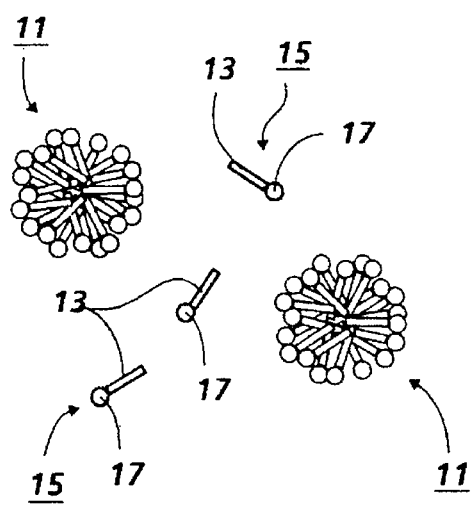
FIG. 2 illustrates schematically a micelle formed of surfactant molecules in aqueous solution.

The inks of the present invention also contain vesicles, or liposomes, of a vesicle-forming lipid. Lipids in general are substances that are soluble in organic solvents but are only sparingly soluble or insoluble in water. Lipids are generally classified according to their backbone structure, and include fatty acids, triacylglycerols, glycerophospholipids, sphingolipids, steroids, and the like. Vesicle-forming lipids usually have two nonpolar "tail" groups attached to a polar "head" group. In aqueous media, vesicle-forming lipids align themselves closely in planar bilayer sheets to minimize the unfavorable interactions between the bulk aqueous phase and the nonpolar groups. These unfavorable interactions are further reduced when the sheets fold on themselves to form closed sealed vesicles known as liposomes. As illustrated in FIG. 1, in aqueous solution a vesicle 1 is formed having a bilayered membrane of lipid molecules 5 having nonpolar ends 3 and polar ends 7, wherein polar ends 7 form both the exterior surface of the vesicle and the interior surface of the vesicle and nonpolar ends 3 form the inner structure of the bilayered membrane. These bilayered structures of vesicle-forming lipids tend to form in preferance to micellar structures because the two nonpolar groups tend to impart to the molecule an overall tubular shape, which is more suitable for this type of aggregation. In contrast, surfactant molecules, which are also amphiphilic but which typically contain only one nonpolar "tail" group attached to a polar "head" group, form spherical micelles above their critical micelle concentration. The conical shape of the surfactant molecules enables formation of aggregations in a spherical micelle. As illustrated schematically in FIG. 2, micelles 11 formed in aqueous solution of surfactant molecules 15 and having nonpolar ends 13 and polar ends 17, are of a solid "ball" type structure. In contrast, vesicles or liposomes are of a hollow "bag" type structure.

Liposomes are able to entrap materials both within the inner compartment of the "bag" "structure" and between the layers of the bilayer membrane. In addition, some liposomes have more than one bilayer membrane, wherein the membranes form concentrically; in this instance, materials can also be entrapped between the bilayer membranes.

Glycerophospholipids are the major lipid component of biological membranes and consist of sn-glycerol-3-phosphate esterified at its C(1) and C(2) positions to fatty acids and at its phosphoryl group to a polar head group X:

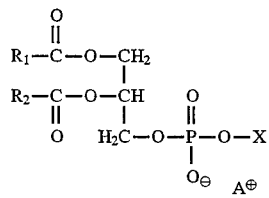

wherein $R_1$ and $R_2$ are aliphatic hydrocarbons, preferably with from about 6 to about 20 carbon atoms, although the number of carbon atoms can be outside this range. Glycerophospholipids are amphiphilic molecules with nonpolar aliphatic tails ($R_1$ and $R_2$) and polar phosphory-X heads. Examples of common classes of glycerophospholipids include phosphatidic acids, wherein X is a hydrogen atom, phosphatidylethanolamines, wherein X is —$CH_2CH_2NH_3^+$, phosphatidylcholines, wherein X is —$CH_2CH_2N(CH_3)_3^+$, phosphatidylserines, wherein X is —$CH_2CH(NH_3^+)COO-$, phosphatidylinositols, wherein X is

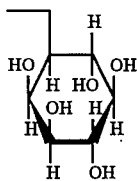

phosphatidylglycerols, wherein X is —CH$_2$CH(OH)CH$_2$OH, diphosphatidylglycerols, wherein X is

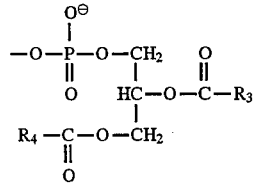

and the like. R$_1$ and R$_2$ (as well as R$_3$ and R$_4$ in the diphosphatidylglycerols) generally are hydrocarbon groups, preferably with from about 6 to about 20 carbon atoms and more preferably with from about 10 to about 18 carbon atoms, although the number of carbon atoms can be outside these ranges. The R groups can be either saturated or non-conjugated unsaturated hydrocarbons. Suitable counterions accompany any charged atoms when X does not contain a net positive charge. Examples of suitable anions include Cl$^-$, Br$^-$, I$^-$, HSO$_4^-$, SO$_4^{2-}$, NO$_3^-$, HCOO$^-$, CH$_3$COO$^-$, HCO$_3^-$, CO$_3^{2-}$, H$_2$PO$_4^-$, HPO$_4^{2-}$, PO$_4^{3-}$, SCN$^-$, BF$_4^-$, ClO$_4^-$, SSO$_3^-$, CH$_3$SO$_3^-$, CH$_3$C$_6$H$_4$SO$_3^-$, or the like, as well as mixtures thereof. Specific examples of glycerolphospholipids include 1,2-dimyristoyl-sn-glycero-3-phosphocholine, wherein R$_1$ and R$_2$ are each —(CH$_2$)$_{12}$CH$_3$ and X is —CH$_2$CH$_2$N(CH$_3$)$_3^+$, 1,2-dipalmitoyl-sn-glycero-3-phosphocholine, wherein R$_1$ and R$_2$ are each —(CH$_2$)$_{12}$CH$_3$ and X is —CH$_2$CH$_2$N(CH$_3$)$_3^+$, 1,2-distearoyl-sn-glycero-3-phosphocholine, wherein R$_1$ and R$_2$ are each —(CH$_2$)$_{14}$CH$_3$ and X is —CH$_2$CH$_2$N(CH$_3$)$_3^+$, 1,2-dimyristoyl-sn-glycero-3-phosphoethanolamine, wherein R$_1$ and R$_2$ are each —(CH$_2$)$_{16}$CH$_3$ and X is —CH$_2$N(CH$_3$)$_3^+$, 1,2-dipalmitoyl-sn-glycero-3-phosphoethanolamine, wherein R$_1$ and, R$_2$ are each —(CH$_2$)$_{12}$CH$_3$ and X is —CH$_2$CH$_2$NH$_3^+$, 1,2-distearoyl-sn-glycero-3-phosphoethanolamine, wherein R$_1$ and R$_2$ are each —(CH$_2$)$_{16}$CH$_3$ and X is —CH$_2$CH$_2$NH$_3^+$, 1,2-dimyristoyl-sn-glycero-3-phosphoglycerol, wherein R$_1$ and R$_2$ are each —(CH$_2$)$_{16}$CH$_3$ and X is —CH$_2$CH(OH)CH$_2$OH, 1,2-dipalmitoyl-sn-glycero-3-phosphoglycerol, wherein R$_1$ and R$_2$ are each —(CH$_2$)$_{14}$CH$_3$ and X is —CH$_2$CH(OH)CH$_2$OH, 1,2-distearoyl-sn-glycero-3-phosphoglycerol, wherein R$_1$ and R$_2$ are each —(CH$_2$)$_{16}$CH$_3$ and X is —CH$_2$CH(OH)CH$_2$OH, 1,2-dimyristoyl-sn-glycero-3-phosphatidic acid, wherein R$_1$ and R$_2$ are each —(CH$_2$)$_{12}$CH$_3$ and X is —H, 1,2-dipalmitoyl-sn-glycero-3-phosphatidic acid, wherein R$_1$ and R$_2$ are each —(CH$_2$)$_{14}$CH$_3$ and X is —H, 1,2-distearoyl-sn-glycero-3-phosphatidic acid, wherein R$_1$ and R$_2$ are each —(CH$_2$)$_{16}$CH$_3$ and X is —H, all available from Sygena, Inc., Cambridge, Mass., and the like. Phospholipids are also available from, for example, Avanti Polar Lipids, Inc., Alabaster, Ala., and available as PRO-LIPO from Lucas Meyer, Paris, France. The PRO-LIPO materials are available in a form such that addition of water to the commercially provided mixture leads to the spontaneous formation of liposomes; these materials are mixtures of lipids with the main component being hydrogenated phosphatidylcholine (soya based), and contain a small amount of negatively charged lipids to facilitate the formation of stable bilayers.

Also suitable are diacylglyceroles, of the general formula

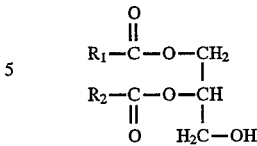

wherein R$_1$ and R$_2$ generally are hydrocarbon groups, either saturated or unsaturated, preferably with from about 10 to about 18 carbon atoms, although the number of carbon atoms can be outside this range. Specific examples of diacylglyceroles include 1,2-dimyristoyl-sn-glycerol, wherein R$_1$ and R$_2$ are each —(CH$_2$)$_{12}$CH$_3$, 1,2-dipalmitoyl-sn-glycerol, wherein R$_1$ and R$_2$ are each —(CH$_2$)$_{14}$CH$_3$, 1,2-distearoyl-sn-glycerol, wherein R$_1$ and R$_2$ are each —(CH$_2$)$_{16}$CH$_3$, all available from Sygena, Inc., Cambridge, Mass., and the like.

Also suitable are α,ω-dipolar diacetyles of the general formula

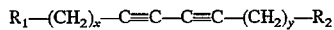

R$_1$—(CH$_2$)$_x$—C≡C—C≡C—(CH$_2$)$_y$—R$_2$ wherein x and y are each integers of from about 6 to about 10, and preferably from about 8 to about 9, and R$_1$ and R$_2$ are each —COOH, —CH$_2$OH, or —CH$_2$OPO$_3$H$_2$, prepared as disclosed in, for example, H. Bader and H. Ringsdorf, "Liposomes From α,ω-Dipolar Amphiphiles With a Polymerizable Diyne Moiety in the Hydrophobic Chain," *Journal of Polymer Science: Polymer Chemistry Edition*, vol. 20, p. 1623 (1982), the disclosure of which is totally incorporated herein by reference.

Cholesterol can be employed to improve the stability of liposomes if desired by including it in the solution containing the liposomes. Examples of mixtures include (but are not limited to) (a) mixtures of phosphatidyl choline (0.63 parts by weight), phosphatidic acid (0.14 parts by weight), and cholesterol (0.39 parts by weight) in water (10 parts by weight), wherein the particles typically exhibit an average diameter of about 100 nanometers; (b) mixtures of cholesterol (2.5 parts by weight), 1,2-dimyristoyl-sn-glycero-3-phosphoglycerol (2.5 parts by weight) in various solvents, such as (i) water (100 parts by weight), (ii) mixtures of water (95 parts by weight) and sulfolane (5 parts by weight), (iii) mixtures of water (95 parts by weight) and ethylene glycol (5 parts by weight), (iv) mixtures of water (93 parts by weight) and butyl carbitol (7 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (c) mixtures of cholesterol (2.5 parts by weight), 1,2-dimyristoyl-sn-glycero-3-phosphoglycerol (1.3 parts by weight), and 1,2-dimyristoyl-sn-glycero-3-phosphoethanolamine (1.3 parts by weight) in various solvents, such as (i) water (100 parts by weight), (ii) mixtures of water (95 parts by weight) and sulfolane (5 parts by weight), (iii) mixtures of water (95 parts by weight) and ethylene glycol (5 parts by weight), (iv) mixtures of water (93 parts by weight) and butyl carbitol (7 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (d) mixtures of cholesterol (3.5 parts by weight) and 1,2-dimyristoyl-sn-glycero-3-phosphoglycerol (1.5 parts by weight) in various solvents, such as (i) water (95 parts by weight), (ii) mixtures of water (95 parts by weight) and sulfolane (5 parts by weight), (iii) mixtures of water (95 parts by weight) and ethylene glycol (5 parts by weight), (iv) mixtures of water (95 parts by weight) and butyl carbitol (5 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (e) mixtures of cholesterol (3.5 parts by weight), 1,2-dimyristoyl-sn-glycero-3-phosphoglycerol (0.5 parts by weight), and 1,2-dimyristoyl-sn-glycero-3-phosphoethanolamine (1.0 part by weight) in various solvents, such as (i) water (95 parts by weight), (ii) mixtures of water (95 parts by weight) and sulfolane (5 parts by weight), (iii) mixtures of water (95 parts by weight) and ethylene glycol (5 parts by weight), (iv) mixtures of water (95 parts by weight) and butyl carbitol (5 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; and any other desired mixture.

The vesicle-forming lipid is present in the ink in any effective amount. Typically, the vesicle-forming lipid is present in the ink in an amount of from about 0.5 to about 20 percent by weight, and preferably from about 1 to about 10 percent by weight, although the amount can be outside these ranges.

Liposomes of the vesicle-forming lipid can be prepared by any desired or suitable method, such as by admixing the lipid and an aqueous vehicle (either pure water or a mixture of water and other components) by mechanical dispersion, micro-emulsification, sonication, membrane extrusion, microfluidization, or the like. For example, a microfluidizer is a machine which pumps fluid at high pressures (up to about 12,000 pounds per square inch) along precisely defined mocrochannels and which divides the fluid into two streams and causes them to collide together at right angles at high velocity. This impingement is arranged so that nearly all of the energy supplied to the system (turbulence and cavitation) remains within the small area of liposome formation, resulting in the production of liposomes of relatively small size and relative uniformity. The lipids can be introduced into the fluidizer either as a suspension of large multi-lamellar vesicles or as a slurry of unhydrated lipid in an aqueous medium. The fluid collected can be recycled through the pump and the interaction chamber until vesicles of the desired dimensions are obtained.

The vesicles in the ink preferably have an average particle diameter less than about 700 namometers and usually are preferred to be less than about 200 nanometers in average particle diameter. Particle size of the vesicles can be adjusted by several methods, such as by the choice of starting materials and substituents thereon, chain length of the hydrophobic portion(s) thereof, etc., by filtration through a controlled pore size, by microfluidization, wherein the particles are impinged on one another, by high shear mechanical mixing, by the identity and concentration of the other ink ingredients, and the like. The other ink ingredients may affect the size and stability of the liposomes. For example, a vesicle-forming lipid may, when admixed with pure water, form liposomes of about 50 nanometers in diameter, but when other ingredients, such as the organic cosolvents and humectants commonly employed in thermal ink jet inks, are added to the composition, the liposomes may swell to diameters of about 100 nanometers because the organic material, which is relatively less polar than water, may have a tendency to push apart the "tails" in the interior or the liposome bilayer membrane, thereby thickening the membrane and possibly rendering it less stable.

The stability of the liposome structures can, if desired, be enhanced. One method of stabilization entails steric stabilization of the liposomes by preparing lipid derivatives of polyalkyl ethers such as polyethylene glycol and incorporating them into the bilayer structure of the liposome membrane. For example, the Stealth Lipid, available from Liposome Technology Incorporated, consists of a polyethylene glycol polymer covalently bonded to a lipid molecule. The presence of the polyethylene glycol sterically stabilizes the liposome by increasing the distance between adjacent bilayers of a multi-membrane liposome without modifying the basic bilayer structure. These materials and processes are disclosed in, for example, U.S. Pat. No. 5,013,556 (Woodie et al.), the disclosure of which is totally incorporated herein by reference. Another method of stabilization entails polymerization of the lipid molecules within the liposome membrane. The molecules within the membrane become bonded to each other to varying degrees. The polymerization stabilizes the liposome membrane, and when, for example, an ink cosolvent or humectant is present, the liposomes may swell but will not rupture. Polymerization is generally carried out by selecting the monomeric lipid to have one or more polymerizable groups, such as an unsaturated group or the like, and effecting polymerization subsequent to vesicle formation by any desired method, such as by application of heat, ultraviolet light, or the like. If desired, a polymerization initiator can be employed. Polymerization of the lipid molecules within liposome membranes is disclosed in, for example, H. Bader and H. Ringsdorf, "Liposomes From $\alpha,\omega$-Dipolar Amphiphiles With a Polymerizable Diyne Moiety in the Hydrophobic Chain," *Journal of Polymer Science: Polymer Chemistry Edition*, vol. 20, p. 1623 (1982); D. F. O'Brien et al., "Preparation and Characterization of Polymerized Liposomes," *Annals New York Academy of Sciences*, vol. 446, P. 282 (1985); P. Tundo et al., "Functionally Polymerized Surfactant Vesicles; Synthesis and Characterization," *J. Am. Chem. Soc*, vol. 104, p. 456 . (1982); K. Kurihara and J. Fendler, "Stabilization of Small Unilamellar Liposomes: Polymerization of Surfactants in Phospholipid Vesicles," *J. Chem. Soc., Chem. Commun.*, vol. 21, p. 1188 (1983); H. Ringsdorf and B. Schlarb, "Liposomes in a Net From Lipids With Ionically or Covalently Bound Polymerizable Headgroups," *Polym. Prepr. (Am. Chem. Soc., Div. Polym. Chem.)*, vol. 27, no. 2, p. 195 (1985); E. Hasegawa et al., "Synthesis of Novel Styrene Groups Containing Glycerophosphocholines and their Polymerization as Liposomes," *Makromol. Chem., Rapid Commun.*, vol. 5, p. 779 (1984); E. Hasegawa et al., "Synthesis of Polymerizable Glycerophosphocholines and their Polymerized Vesicles," *Polymer Bulletin*, vol. 14, p. 31 (1985); P. Tyminski and I. Ponticello, "Polymerizable Dienoyl Lipids as Spectroscopic Bilayer Membrane Probes," *J. Am. Chem. Soc.*, vol. 109, p. 6541 (1987); H. Ohno et al., "Gamma-Ray Polymerization of Phospholipids Having Diene or Triene Groups as Liposomes," *Journal of Polymer Science: Polymer Chemistry Edition*, vol. 24, p. 2959 (1986); and V. Torchilin et al., "Polymerization of Liposome-Encapsulated Hydrophilic Monomers," *Makromol. Chem., Rapid Commun.*, vol. 8, p. 457 (1987); the disclosures of each of which are totally incorporated herein by reference. Alternatively, the liposome membrane can be coated with a polymer net, wherein the polymer is adsorbed onto the vesicle membrane but without any covalent linkage between the vesicle and the polymer, as disclosed in, for example, K. Alley, *Makromol. Chem., Rapid Commun.*, vol.

5, p. 345 (1984), the disclosure of which is totally incorporated herein by reference.

Inks of the present invention also contain a photochromic material. In some embodiments of the present invention, photochromic molecules are contained within the central cavities of the liposomes. In other embodiments of the present invention, photochromic molecules are contained between two or more membrane structures within vesicles having two or more bilayer membranes. In yet other embodiments of the present invention, photochromic molecules are contained within the vesicle membrane, and are situated between the molecules forming the bilayer membrane. In still other embodiments of the present invention, photochromic materials are selected to have an ionic attraction to the liposomes. For example, cationic photochromic molecules can be employed well with liposomes having anionic moieties on the surface structures thereof. The photochromic molecules can be ionically associated with the liposome either on the inner surface of the vesicle, or on the outer surface of the vesicle, or on both the inner and outer surfaces of the vesicle. If desired, one or more alcohols can be included in the ink to enhance the solubility of alcohol soluble photochromic materials. Oil soluble photochromic materials can also be employed and can be encapsulated within the liposomic structures. In some embodiments, oil soluble photochromic materials are trapped within the membrane and not within the internal cavity of the liposome. Water soluble photochromic materials can also be employed in these embodiments. Inks containing water or alcohol soluble photochromic materials can be prepared by preparing a concentrate of the lipid molecules with the photochromic material in water. The concentrate is then diluted with water while agitating with a high speed stirrer or polytron to yield encapsulated materials. In another embodiment, all ink ingredients are mixed in water followed by microfluidizing the mixture for periods of, for example, from about 1 to about 10 minutes at, for example, from about 5,000 to about 30,000 pounds per square inch. Microfluidization may be preferred for higher yields of encapsulation and better control of the liposome size and size distribution.

Inks of the present invention also contain a photochromic material. Examples of suitable photochromic materials include compounds that undergo heterolytic cleavage, such as spiropyrans and related compounds, and the like; compounds that undergo homolytic cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others.

More specifically, examples include spiropyrans, of the general formula

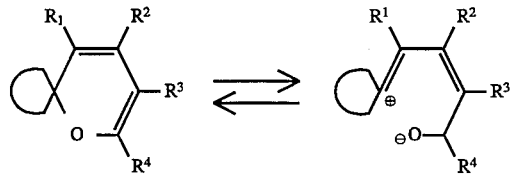

wherein $R_1$, $R_2$, $R_3$, and $R_4$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirooxazines, of the general formula

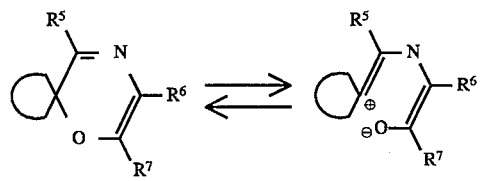

wherein $R^5$, $R^6$, and $R^7$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirothiopyrans, of the general formula

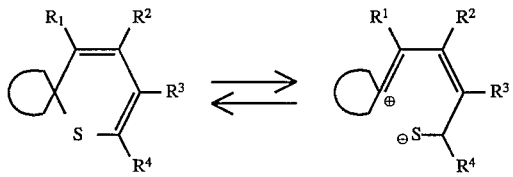

wherein $R_1$, $R_2$, $R_3$, and $R_4$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 30 carbon atoms and more preferably with from about 5 to about 20 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spiropyrans include spiro[2H-1-benzopyran-2,2'-indolines], including those of the general formula

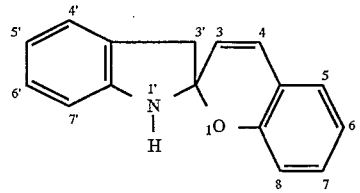

wherein substituents can be present on one or more of the 1', 3', 4', 5', 6', 7', 3, 4, 5, 6, 7, and 8 positions, spiroindolinonaphthopyrans, including those of the general formula

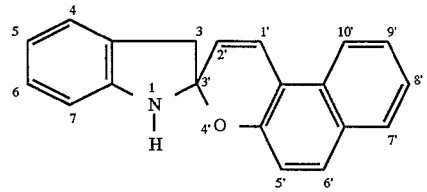

wherein substituents can be present on one or more of the 1, 3, 4, 5, 6, 7, 1', 2', 5', 6', 7', 8', 9', or 10' positions, spiro[2H-1-benzopyran-2,2'-benzothiazolines], including those of the general formula

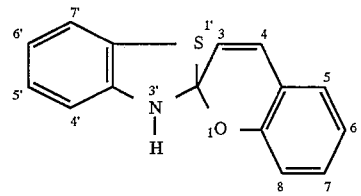

wherein substituents can be present on one or more of the 1', 3', 4', 5', 6', 7', 3, 4, 5, 6, 7, and 8 positions, spiro[2H-1-benzopyran-2,2'-benzoxazolines], including those of the general formula

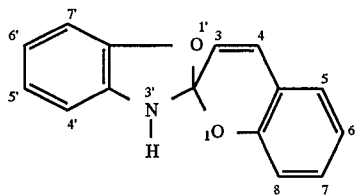

wherein substituents can be present on one or more of the 1', 3', 4', 5', 6', 7', 3, 4, 5, 6, 7, and 8 positions, spiropyranopyrans, including those of the general formula

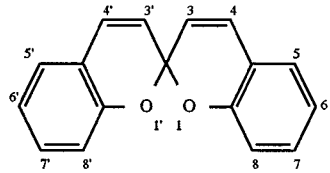

wherein substituents can be present on one or more of the 3, 4, 5, 6, 7, 8, 3', 4', 5', 6', 7', and 8' positions, azaspiroindolinopyrans, including those of the general formula

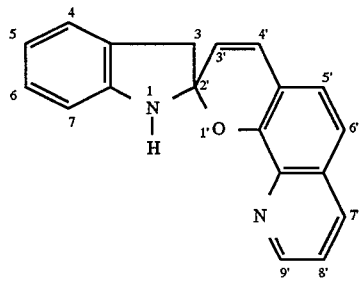

wherein substituents can be present on one or more of the 3, 4, 5, 6, 7, 3', 4', 5', 6', 7', 8', and 9' positions, spiro(quinolinopyrans), including those of the general formula

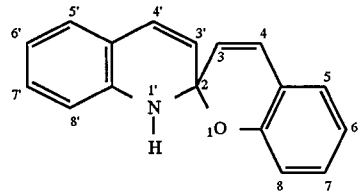

wherein substituents can be present on one or more of the 3, 4, 5, 6, 7, 8, 3', 4', 5', 6', 7', and 8' positions, spiro(pyridino pyrans), including those of the general formula

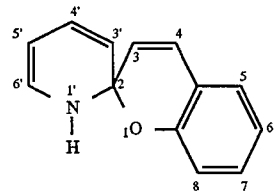

wherein substituents can be present on one or more of the 3, 4, 5, 6, 7, 8, 3', 4', 5', and 6' positions, and the like.

Examples of spirooxazines include spiro[indoline-2,3'-[3H]naphtho[2, 1-b]-1,4-oxazines], including those of the general formula

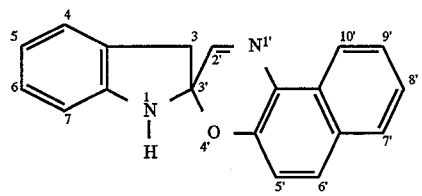

wherein substituents can be present on one or more of the 1, 3, 4, 5, 6, 7, 1', 2', 5', 6', 7', 8', 9', or 10' positions, spiro[2H-1,4-benzoxazine-2,2'-indolines], including those of the general formula

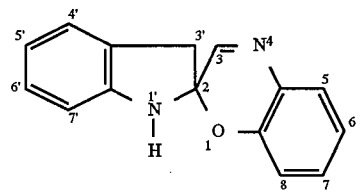

wherein substituents can be present on one or more of the 3, 5, 6, 7, 8, 1', 3', 4', 5', 6', and 7' positions, and the like.

Examples of spirothiopyrans include spiro[2H-1-benzothiopyran-2,2'-indolines], including those of the general formula

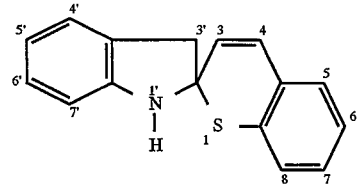

wherein substituents can be present on one or more of the 1', 3', 4', 5', 6', 7', 3, 4, 5, 6, 7, and 8 positions, and the like.

In all of the above examples of spiropyrans, spirooxazines, and spirothiopyrans, examples of substituents include (but are not limited to) alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Substituents on the left ring of the spiropyrans, spirooxazines, and spirothiopyrans (represented by the loop in the generic structural formulae of these materials) can be adjusted to affect the color of the open form of the material. Substituents on the central moiety of the spiropyrans, spirooxazines, and spirothiopyrans or on alkyl or aryl groups attached thereto also affect the color of the open form of the material, although to a lesser degree than substituents on the left ring. Further, when the left ring contains a nitrogen atom, this atom or other atoms can be substituted to affect the solubility of the compound in various liquids and resins. For example, long chain hydrocarbons, such as those with 16 or 18 carbon atoms, can increase solubility in hydrocarbons. Sulfonate and carboxylate groups, for example, can enhance water solubility.

Specific examples of spiropyrans, spirooxazines, and spirothiopyrans include spiro[2H-1-benzopyran-2,2'-indoline]; 8-acetoxymercuri-6-nitro-1',3',3'-trimethylspiro[2H-1-benzopyran-2,2'-indoline]; 6-acetyl-1',3'3'-trimethylspiro[2H-1-benzopyran-2,2'-indoline]; 8-allyl-5'-chloro-6-nitro-1',3',3'-trimethylspiro[2H-1-benzopyran-2,2'-indoline]; 8-allyl-3',3'-dimethyl-6'-nitro-1'-phenylspiro[2H-1-benzopyran-2,2'-indoline]; 8-allyl-6-nitro-1',3,3',3'-tetramethylspiro[2H-1-benzopyran-2,2'-indoline]; 8-allyl-6-nitro-1',3',3'-trimethylspiro[2H-1-benzopyran-2,2'indoline]; 8-allyl-1',3',3'-trimethylspiro[2H-1-benzopyran-2,2'-indoline]; 5'-amino-5,7-dichloro-6-nitro-1',3',3'-trimethylspiro[2H-1-benzopyran-2,2'-indoline]; 6-amino-7-hydroxy-1',3',3'-trimethylspiro[2H-1-benzopyran-2,2'-indoline]; 5'-amino-8-methoxy-6-nitro-1',3',3'-trimethylspiro[2H-1-benzopyran-2,2'-indoline]; 5-amino-8-methoxy-1',3',3'-trimethylspiro[2H-1-benzopyran-2,2'-indoline]; 5'-amino-8-methoxy-1',3',3'-trimethylspiro[2H-1-benzopyran-2,2'-indoline]; 5'-amino-6-nitro-1',3',3'-trimethylspiro[2H-1-benzopyran-2,2'-indoline]; 5'-amino-1',3',3'-triimethylspiro[2H-1-benzopyran-2,2'-indoline]; 6-amino-1',3',3'-trimethylspiro[2H-1-benzopyran-2,2'-indoline]; 8-amino-1',3',3'-trimethylspiro[2H-1-benzopyran-2,2'-indoline]; 1'-amyl-5-bromo-3',3'-dimethyl-8-methoxy-6-nitrospiro[2H-1-benzopyran-2,2'-indoline]; 1'-amyl-3',3'-dimethyl-8-methoxyspiro[2H-1-benzopyran-2,2'-indoline]; 1'-amyl-3',3-dimethyl-6-methoxy-8-nitrospiro[2H-1-benzopyran-2,2'-indoline]; 1'-amyl-3',3-dimethyl-5',6-dinitro-8-methoxyspiro[2H-1-benzopyran-2,2'indoline]; 1'-amyl-3',3-dimethyl-8-methoxy-5,5',6-trinitrospiro[2H-1-benzopyran-2,2'-indoline]; 1'-amyl-3,3'-dimethyl-6-nitrospiro[2H-1-benzopyran-2,2'-indoline]; 6-bromo-1'-butyl-3',3'-dimethylspiro[2H-1-benzopyran-2,2'-indoline]; 8-bromo-1'-butyl-3',3'-dimethyl-6-nitrospiro[2H-1-benzopyran-2,2'-indoline]; 8-bromo-5'-chloro-5,7-dimethoxy-6-nitro-1',3',3'-trimethylspiro[2H-1-benzopyran-2,2'-indoline]; 8-bromo-5'-chloro-7-hydroxy-1',3',3'-trimethylspiro[2H-1-benzopyran-2,2'-indoline]; 5-bromo-5'-chloro-8-methoxy-1',3',3'-trimethylspiro[2H-1-benzopyran-2,2'-indoline]; 6-bromo-5'-chloro-8-methoxy-1',3',3'-trimethylspiro[2H-1-benzopyran-2,2'-indoline]; 5-bromo-6'-chloro-8-methoxy-6-nitro-1',3',3',7'-tetramethylspiro[2H-1-benzopyran-2,2'-indoline]; 5-bromo-5'-chloro-6-methoxy-8-nitro-1',3',3'-trimethylspiro[2H-1-benzopyran-2,2'-indoline]; 5-bromo-5'-chloro-8-methoxy-6-nitro-1',3',3'-trimethylspiro[2H-1-benzopyran-2,2'-indoline]; 5-bromo-7'-chloro-8-methoxy-6-nitro-1',3',3'-trimethylspiro[2H-1-benzopyran-2,2'-indoline]; 6-bromo-5'-chloro-8-nitro-1',3',3'-trimethylspiro[2H-1-benzopyran-2,2'-indoline]; 8-bromo-5'-chloro-6-nitro-1',3',3'-trimethylspiro[2H-1-benzopyran-2,2'-indoline]; 5-bromo-4',6'-dichloro-8-methoxy-6-nitro-1',3',3'-trimethylspiro[2H-1-benzopyran-2,2'-indoline]; 5-bromo-4',7'-dichloro-8-methoxy-6-nitro-1',3',3'-trimethylspiro[2H-1-benzopyran-2,2'indoline]; 5-bromo-5',7'-dichloro-8-methoxy-6-nitro-1',3',3'-trimethylspiro[2H-1-benzopyran-2,2'-indoline]; 6-bromo-5'-chloro-1',3',3'-trimethylspiro[2H-1-benzopyran-2,2'-indoline]; 5-bromo-3',3'-diethyl-8-methoxy-1'-methyl-6-nitrospiro[2H-1-benzopyran-2,2'-indoline]; 5-bromo-5',8-dimethoxy-6-nitro-1',3',3'-trimethylspiro[2H-1-benzopyran-2,2'-indoline]; 5-bromo-7',8-dimethoxy-6-nitro-1',3',3'-trimethylspiro[2H-1benzopyran-2,2'-indoline]; 6-bromo-5',8-dimethoxy-1',3',3'-trimethylspiro[2H-1-benzopyran-2,2'-indoline]; 6-bromo-3',3'-dimethyl-1'-ethylspiro[2H-1-benzopyran-2,2'-indoline]; 6-bromo-3',3'-dimethyl-1'-ethyl-8-methoxyspiro[2H-1-benzopyran-2,2'-indoline]; 5-bromo-1',3'-dimethyl-3'-ethyl-6-methoxy-8-nitrospiro[2H-1-benzopyran-2,2'-indoline]; 5-bromo-1',3'-dimethyl-3'-ethyl-8-methoxy-6-nitrospiro[2H-1-benzopyran-2,2'-indoline]; 8-bromo-3',3'-dimethyl-1'-ethyl-6-nitrospiro[2H-1-benzopyran-2,2'-indoline]; 5-bromo-3',3'-dimethyl-1'-isoamyl-8-methoxy-6-nitrospiro[2H-1-benzopyran-2,2'-indoline]; 5-bromo-1',3'-dimethyl-6-methoxy-8-nitro-3'-phenylspiro[2H-1-benzopyran-2,2'-indoline]; 5-bromo-1',3'-dimethyl-8-methoxy-6-nitro-3'-phenylspiro[2H-1-benzopyran-2,2'indoline]; 5-bromo-3',3'-dimethyl-6-methoxy-8-nitro-1'-phenylspiro[2H-1-benzopyran-2,2'-indoline]; 5-bromo-3',3'-dimethyl-8-methoxy-6-nitro-1'-phenylspiro[2H-1-benzopyran-2,2'-indoline]; 8-bromo-3',3'-dimethyl-6-nitro-1'-propylspiro[2H-1-benzopyran-2,2'-indoline]; 6-bromo-3',3'-dimethyl-1'-propylspiro[2H-1-benzopyran-2,2'-indoline]; 5-bromo-1'-dimethylamino-8-methoxy-3'-methyl-6-nitro-3'-phenylspiro[2H-1-benzopyran-2,2'-indoline]; 5-bromo5',6-dinitro-8-methoxy-1',3',3'-trimethylspiro[2H-1-benzopyran-2,2'-indoline]; 5-bromo-3',3'-diphenyl-8-methoxy-1'-methyl-6-nitrospiro[2H-1-benzopyran-2,2'-indoline]; 5-bromo-4',6'-diphenyl-8-methoxy-6-nitro-1',3',3'-trimethylspiro[2H-1-benzopyran-2,2'-indoline]; 5-bromo-4'-fluoro-8-methoxy-6-nitro-1',3',3'-trimethylspiro[2H-1-benzopyran-2,2'-indoline]; 5-bromo-5'-fluoro-8-methoxy-6-nitro-1',3',3'-trimethylspiro[2H-1-benzopyran-2,2'-indoline]; 8-bromo-7-hydroxy-1',3',3'-trimethylspiro[2H-1-benzopyran-2,2'-indoline]; 5-bromo-8-methoxy-6-nitro-1',3',3',4',7'-pentamethylspiro[2H-1-benzopyran-2,2'-indoline]; 5-bromo-8-methoxy-6-nitro-1',3',3',5',7'-pentamethylspiro[2H-1-benzopyran-2,2'-indoline]; 5-bromo-6-methoxy-8-nitro-5'-phenyl-1',3',3'-trimethylspiro[2H-1-benzopyran-2,2'-indoline]; 5-bromo-6-methoxy-8-nitro-7'-phenyl-1',3',3'-trimethylspiro[2H-1-benzopyran-2,2'-indoline]; 5-bromo-8-methoxy-6-nitro-5'-phenyl-1',3',3'-trimethylspiro[2H-1-benzopyran-2,2'-indoline]; 5-bromo-8-methoxy-6-nitro-7'-phenyl-1',3',3'-trimethylspiro[2H-1-benzopyran-2,2'-indoline]; 5-bromo-8- methoxy-6-nitro-1',3,3',3'-tetramethylspiro[2H-1-benzopyran-2,2'-indoline]; 5-bromo-8-methoxy-6-nitro-1',3',3',5'-tetramethylspiro[2H-1-benzopyran-2,2'-indoline]; 5-bromo-8-methoxy-6-nitro-1',3',3',6'-tetramethylspiro[2H-1-benzopyran-2,2'-indoline]; 5-bromo-8-methoxy-6-nitro-1',3',3',7'-tetramethylspiro[2H-1-benzopyran-2,2'-indoline]; 5-bromo-6-methoxy-8-nitro-1',3',3'-trimethylspiro[2H-1-benzopyran-2,2'-indoline]; 5'-bromo-6-methoxy-8-nitro-1',3',3'-trimethylspiro[2H-1-benzopyran-2,2'-indoline]; 5'-bromo-8-methoxy-6-nitro-1',3',3'-trimethylspiro[2H-1-benzopyran-2,2'-indoline]; 5'-bromo-8-methoxy6-nitro-1',3',3'-trimethylspiro[2H-1-benzopyran-2,2'-indoline]; 6-bromo-8-methoxy-5-nitro-1',3',3'-trimethyl-4',6',7'-triphenylspiro[2H-1-benzopyran-2,2'-indoline]; 5-bromo-8-methoxy-1',3',3'-trimethylspiro[2H-1-benzopyran-2,2'-indoline]; 6-bromo-5'-methoxy-1',3',3'-trimethylspiro[2H-1-benzopyran-2,2'-indoline]; 6-bromo-8-methoxyl-1',3',3'-trimethylspiro[2H-1-benzopyran-2,2'-indoline]; 6-bromo-8-nitro-1',3,3',3'-tetramethylspiro[2H-1-benzopyran-2,2'-indoline]; 6-bromo-8- nitro-1',3,3',3'-tetramethylspiro[2H-1-benzopyran-2,2'-indoline]; 5-bromo-6-nitro-4',6',8-trimethoxy-1',3',3'-trimethylspiro[2H-1-benzopyran-2,2'-indoline]; 5-bromo-6-nitro-4',7',8-trimethoxy-1',3',3'-trimethylspiro[2H-1-benzopyran-2,2'-indoline]; 5-bromo-6-nitro-1',3',3'-trimethylspiro[2H-1-benzopyran-2,2'-indoline]; 5'-bromo-6-nitro-1',3',3'-trimethylspiro[2H-1-benzopyran-2,2'-indoline]; 6-bromo-8-nitro-1',3',3'-trimethylspiro[2H-1-benzopyran-2,2'-indoline]; 8-bromo-6-nitro-1',3',3'-trimethylspiro[2H-1-benzopyran-2,2'-indoline]; 6-bromo-5'-nitro-1',3',3'-trimethylspiro[2H-1-benzopyran-2,2'-indoline]; 6-bromo-1',3',3'-trimethylspiro[2H-1-benzopyran-2,2'-indoline]; 1'-butyl-6-chloro-3',3'-dimethyl-8-methoxyspiro[2H-1-benzopyran2,2'-indoline]; 1'-butyl-3',3'-dimethylspiro[2H-1-benzopyran-2,2'-indoline]; 1'-butyl-3',3'-dimethyl-6,8-dinitrospiro[2H-1-benzopyran-2,2'-indoline]; 1'-butyl-3 ',3'-dimethyl-8-methoxyspiro[2H-1-benzopyran-2,2'-indoline]; 8-carbomethoxy-5'-chloro-1',3',3'-trimethylspiro[2H-1-benzopyran-2,2'-indoline]; 5'-carbomethoxy-6-nitro-1',3',3'-trimethylspiro[2H-1-benzopyran-2,2'-indoline]; 8-carbomethoxy-6-nitro-1',3',3'-trimethylspiro[2H-1-benzopyran-2,2'indoline]; 6-carbomethoxy-1',3',3'-trimethylspiro[2H-1-benzopyran-2,2'indoline]; 8-carbomethoxy-1',3',3'-trimethylspiro[2H-1-benzopyran-2,2'indoline]; 6-carboxy-8-methoxy-1',3',3'-trimethylspiro[2H-1-benzopyran-2,2'-indoline]; 5'-carboxy-6-nitro-1',3',3'-trimethylspiro[2H-1-benzopyran-2,2'-indoline]; 6-carboxy-1',3',3'-trimethylspiro[2H-1-benzopyran-2,2'indoline]; 7-carboxy-1',3',3'-trimethylspiro[2H-1-benzopyran-2,2'-indoline]; 8-carboxy-1',3',3'-trimethylspiro[2H-1-benzopyran-2,2'-indoline]; 5'-chloro-6,8-dibromo-1',3',3'-trimethylspiro[2H-1-benzopyran-2,2'-indoline]; 6'-chloro-5,7-dimethoxy-6-nitro-1',3',3'-trimethylspiro[2H-1-benzopyran-2,2'-indoline]; 5'-chloro-5,7-dimethoxy-6-nitro-1',3',3'-trimethylspiro[2H-1-benzopyran-2,2'-indoline]; 5'-chloro7,8-dimethoxy-6-nitro-1',3',3'-trimethylspiro[2H-1-benzopyran-2,2'-indoline]; 7'-chloro-5,7-dimethoxy-6-nitro-1',3',3'-trimethylspiro[2H-1-benzopyran-2,2'-indoline]; 5'-chloro5,7-dimethoxy-1',3',3'-trimethylspiro[2H-1benzopyran-2,2'-indoline]; 6-chloro-5',8-dimethoxy-1',3',3'-trimethylspiro[2H-1-benzopyran-2,2'-indoline]; 6-chloro-7',8-dimethoxy-1'-1',3',3'-trimethylspiro[2H-1-benzopyran-2,2'-indoline]; 6-chloro-3',3'-dimethyl-1-ethyl-8-methoxyspiro[2H-1-benzopyran-2,2'-indoline]; 5-chloro-1',3'-dimethyl8-methoxy-6-nitro-3'-phenylspiro[2H-1-benzopyran-2,2'indoline]; 6-chloro-3',3'-dimethyl-8-methoxy-1'-phenylspiro[2H-1-benzopyran-2,2'-indoline];

6-chloro-3',3'-dimethyl-8-nitro-1'-phenylspiro[2H-1-benzopyran-2,2'-indoline]; 5'-chloro-5,6-dinitro-8-methoxy-1',3',3'-trimethylspiro[2H-1-benzopyran-2,2'-indoline]; 5'-chloro-6,6'-dinitro-8-methoxy-1',3',3'-trimethylspiro[2H-1-benzopyran-2,2'indoline]; 5'-chloro-6,8-dinitro-7-methoxy-1',3',3'-trimethylspiro[2H-1 -benzopyran-2,2'-indoline]; 7'-chloro-5,6-dinitro-8-methoxy-1',3',3'-trimethylspiro[2H-1-benzopyran-2,2'-indoline]; 5'-chloro-6,6'-dinitro-1',3',3'-trimethylspiro[2H-1-benzopyran-2,2'-indoline]; 5'-chloro-6,8-dinitro-1',3',3'-trimethylspiro[2H-1-benzopyran-2,2'-indoline]; 6-chloro-5',8-dinitro-1',3',3'-trimethylspiro[2H-1-benzopyran-2,2'-indoline]; 5'-chloro-7-ethoxy-6-nitro-1',3',3'-trimethylspiro[2H-1-benzopyran-2,2'-indoline]; 5-chloro-8-ethoxy-6-nitro-1',3',3'-trimethylspiro[2H-1-benzopyran-2,2'-indoline]; 5'-chloro-8-ethoxy-6-nitro-1',3',3'trimethylspiro[2H-1-benzopyran-2,2'-indoline]; 5'-chloro-8-ethoxy-1',3',3'-trimethylspiro[2H-1-benzopyran-2,2'-indoline]; 6-chloro-8-ethoxy-1',3',3'-trimethylspiro[2H-1-benzopyran-2,2'-indoline]; 5'-chloro-8-fluoro-6-nitro-1',3',3'-trimethylspiro[2H-1-benzopyran-2,2'-indoline]; 5'-chloro-8-fluoro-1',3',3'-trimethylspiro[2H-1-benzopyran-2,2'-indoline]; 5'-chloro-6-formyl-1',3',3'-trimethylspiro[2H-1-benzopyran-2,2'-indoline]; 5'-chloro-6-hydroxy-8-methoxy-1',3',3'-trimethylspiro[2H-1-benzopyran-2,2'-indoline]; 5'-chloro-6-iodo-8-nitro-1',3',3'-trimethylspiro[2H-1-benzopyran-2,2'-indoline]; 5'-chloro-8-iodo-6-nitro-1',3',3'-trimethylspiro[2H-1-benzopyran-2,2'-indoilne]; 5'-chloro-7-methoxy-6-nitro-1',3',3',5-tetramethylspiro[2H-1-benzopyran-2,2'-indoline]; 5-chloro-8-methoxy-6-nitro-1',3',3'-trimethylspiro[2H-1-benzopyran-2,2'-indoline]; 5'-chloro-6-methoxy-8-nitro-1',3',3'-trimethylspiro[2H-1-benzopyran-2,2'-indoline]; 5'-chloro-7-methoxy-6-nitro-1',3',3'-trimethylspiro[2H-1-benzopyran-2,2'-indoline]; 5'-chloro-8-methoxy-5-nitro-1',3',3'-trimethylspiro[2H-1-benzopyran-2,2'-indoline]; 5'-chloro-8-methoxy-8-nitro-1',3',3'-trimethylspiro[2H-1-benzopyran-2,2'-indoline]; 6-chloro-5'-methoxy-8-nitro-1',3',3'-trimethylspiro[2H-1-benzopyran-2,2'-indoline]; 7'-chloro-6-methoxy-8-nitro-1',3',3'-trimethylspiro[2H-1-benzopyran-2,2'-indoline]; 7'-chloro-8-methoxy-6-nitro-1',3',3'-trimethylspiro[2H-1-benzopyran-2,2'-indoline]; 5-chloro-6-methoxy-1',3',3'-trimethylspiro[2H-1-benzopyran-2,2'-indoline]; 5'-chloro-8-methoxy-1',3',3'-trimethylspiro[2H-1-benzopyran-2,2'-indoline];5'-chloro-8-methoxy-1',3',3'-trimethylspiro[2H-1-benzopyran -2,2'-indoline]; 6-chloro-5'-methoxy-1',3',3'-trimethylspiro[2H-1-benzopyran-2,2'-indoline]; 6-chloro-8-methoxy-1',3',3'-trimethylspiro[2H-1-benzopyran-2,2'-indoline]; 5'-chloro-8-methoxy-1',3',3'-trimethyl5,6,6'-trinitrospiro[2H-1-benzopyran-2,2'-indoline]; 5'-chloro-6-nitro-1',3',3',5,7-pentamethylspiro[2H-1-benzopyran-2,2'-indoline]; 5'-chloro-6-nitro-1',3',3',5,8-pentamethylspiro[2H-1-benzopyran-2,2'-indoline]; 6-chloro-8-nitro-1',3',3',5,7-pentamethylspiro[2H-1-benzopyran-2,2'-indoline]; 7-chloro-6-nitro-1',3,3',3'-tetramethylspiro[2H-1-benzopyran-2,2'-indoline]; 4'-chloro-6-nitro-1',3',3'-trimethylspiro[2H-1-benzopyran-2,2'-indoline]; 5-chloro-6-nitro-1',3',3'-trimethylspiro[2H-1-benzopyran-2,2'-indoline]; 5'-chloro-6-nitro-1',3',3'-trimethylspiro[2H-1-benzopyran-2,2'-indoline]; 5'-chloror-8-nitro-1',3',3'-trimethylspiro[2H-1-benzopyran-2,2'-indoline]; 6'-chloro-6-nitro-1',3',3'-trimethylspiro[2H-1-benzopyran-2,2'-indoline]; 6-chloro-8-nitro-1',3',3'-trimethylspiro[2H-1-benzopyran-2,2'-indoline]; 7-chloro-6-nitro-1',3',3'-trimethylspiro[2H-1-benzopyran-2,2'-indoline]; 7'-chloro-6-nitro-1',3',3'-trimethylspiro[2H-1-benzopyran-2,2'-indoline]; 7-chloro-8-nitro-1',3',3'-trimethylspiro[2H-1-benzopyran-2,2'-indoline]; 8-chloro-6- nitro-1',3',3'-trimethylspiro[2H-1-benzopyran-2,2'-indoline]; 5'-chloro-6-(β-nitrovinyl)-1',3',3'-trimethylspiro[2H-1-benzopyran-2,2'-indoline]; 5'-chloro-1',3',3',5,7-pentamethylspiro[2H-1-benzopyran-2,2'-indoline]; 6-chloro-4',7',8'-trimethoxy-1',3',3'-trimethylspiro[2H-1-benzopyran-2,2'-indoline]; 5-chloro-1',3',3'-trimethylspiro[2H-1-benzopyran-2,2'-indoline]; 5'-chloro-1',3',3'-trimethylspiro[2H-1-benzopyran-2,2'-indoline]; 6-chloro-1',3',3'-trimethylspiro[2H-1-benzopyran-2,2'-indoline]; 7-chloro-1',3',3'-trimethylspiro[2H-1-benzopyran-2,2'-indoline]; 8-chloro-1',3',3'-trimethylspiro[2H-1-benzopyran-2,2'-indoline]; 6-cyano-1',3',3'-trimethylspiro[2H-1-benzopyran-2,2'-indoline]; 6,8-diallyl-1',3',3'-trimethylspiro[2H-1-benzopyran-2,2'-indoline]; 5,6-dibromo-8-methoxy-1',3',3'-trimethylspiro[2H-1-benzopyran-2,2'-indoline]; 6,8-dibromo-5'-methoxy-1',3',3'-trimethylspiro[2H-1-benzopyran-2,2'-indoline]; 6,8-dibromo-5-nitro-1',3',3'-trimethylspiro[2H-1-benzopyran-2,2'-indoline]; 6,8-dibromo-1',3',3'-trimethylspiro[2H-1-benzopyran-2,2'-indoline]; 4',7'-dichloro-5,7-dimethoxy-6-nitro-1',3',3'-trimethylspiro[2H-1-benzopyran-2,2'-indoline]; 5',8-dichloro-5,7-dimethoxy-6-nitro-1',3',3'-trimethylspiro[2H-1-benzopyran-2,2'-indoline]; 5,6-dichloro-3',3'-dimethyl-8-ethoxy-1'-phenylspiro[2H-1-benzopyran-2,2'-indoline]; 5,7-dichloro-1',3'-dimethyl-6-nitro-3'-phenylspiro[2H-1-benzopyran-2,2'-indoline]; 5,7-dichloro-3',3'-dimethyl-6-nitro-1'-phenylspiro[2H-1-benzopyran-2,2'-indoline]; 4',7'-dichloro-5,6-dinitro-8-methoxy-1',3',3'-trimethylspiro[2H-1-benzopyran-2,2'-indoline]; 4',7'-dichloro-7,8-dinitro-6-methoxy-1',3',3'-trimethylspiro[2H-1-benzopyran-2,2'-indoline]; 5,7-dichloro-5',6-dinitro-1',3',3'-trimethylspiro[2H-1-benzopyran-2,2'-indoline]; 5,7-dichloro-4',6'-diphenyl-6-nitro-1',3',3'-trimethylspiro[2H-1-benzopyran-2,2'-indoline]; 5,6-dichloro-8-ethoxy-1',3',3'-trimethylspiro[2H-1-benzopyran-2,2'-indoline]; 4',7'-dichloro-8-methoxy-6-nitro-1',3',3'-trimethylspiro[2H-1-benzopyran-2,2'-indoline]; 5,7-dichloro-5'-methoxy-6-nitro-1',3',3'-trimethylspiro[2H-1-benzopyran-2,2'-indoline]; 5,7-dichloro-7'-methoxy-6-nitro-1',3',3'-trimethylspiro[2H-1-benzopyran-2,2'-indoline]; 4',7'-dichloro-8-methoxy-1',3',3'-trimethylspiro[2H-1-benzopyran-2,2'-indoline]; 5,6-dichloro-8-methoxy-1',3',3'-trimethylspiro[2H-1-benzopyran-2,2'-indoline]; 5',6-dichloro-8-methoxy-1',3',3'-trimethylspiro[2H-1-benzopyran-2,2'-indoline]; 6,7'-dichloro-8-methoxy-1',3',3'-trimethylspiro[2H-1-benzopyran-2,2'-indoline]; 5,7-dichloro-6-nitro-1',3',3',4',7'-pentamethylspiro[2H-1-benzopyran-2,2'-indoline]; 5,7-dichloro-6-nitro-1',3',3',5',8'-pentamethylspiro[2H-1-benzopyran-2,2'-indoline]; 5,7-dichloro-6-nitro-7'-phenyl-1',3',3'-trimethylspiro[2H-1-benzopyran-2,2'-indoline]; 5,7-dichloro-6-nitro-4',5',6',7'-tetrafluoro-1',3',3'-trimethylspiro[2H-1-benzopyran-2,2'-indoline]; 4',6'-dichloro-6-nitro-1',3',3'-trimethylspiro[2H-1-benzopyran-2,2'-indoline]; 4',7'-dichloro-6-nitro-1',3',3'-trimethylspiro[2H-1-benzopyran-2,2'-indoline]; 4,7-dichloro-6-nitro-1',3',3',5'-tetramethylspiro[2H-1-benzopyran-2,2'-indoline]; 5,5'-dichloro-6-nitro-1',3',3'-trimethylspiro[2H-1-benzopyran-2,2'-indoline]; 5',6-dichloro-8-nitro-1',3',3'-trimethylspiro[2H-1-benzopyran-2,2'-indoline]; 5,7-dichloro-6-nitro-1',3',3'-trimethylspiro[2H-1-benzopyran-2,2'-indoline]; 5,8-dichloro-6-nitro-1',3',3'-trimethylspiro[2H-1-benzopyran-2,2'-indoline]; 5',7'-dichloro-6-nitro-1',3',3'-trimethylspiro[2H-1-benzopyran-2,2'-indoline]; 5',8-dichloro-6-nitro-1',3',3'-trimethylspiro[2H-1-benzopyran-2,2'-indoline]; 6,8-dichloro-5-nitro-1,3',3'-trimethylspiro[2H-1-benzopyran-2,2'-indoline]; 7,8-dichloro-6-nitro-1',3',3'-trimethylspiro[2H-1-benzopyran-2,2'-indoline]; 5,7-dichloro-6-nitro-1',3',3'-trimethyl4',6',7'-triphenylspiro[2H-1benzopyran-2,2'-indoline]; 5',6-dichloro-1',3',3'-trimethylspiro[2H-1-benzopyran-2,2'-indoline]; 5,7-dichloro-1',3',3'-trimethylspiro[2H-1-benzopyran-2,2'-indoline]; 5',7-dichloro-1',3',3'-trimethylspiro[2H-1-benzopyran-2,2'-indoline]; 6,8-dichloro-1',3',3'-trimethylspiro[2H-1-benzopyran-2,2'-indoline]; 7,8-dichloro-1',3',3'-trimethylspiro[2H-1-benzopyran-2,2'-indoline]; 4',7'-diethoxy-8-methoxy-1',3',3'-trimethylspiro[2H-1-benzopyran-2,2'-indoline]; 3',3'-diethyl-6-methoxy-1'-methyl-8-nitrospiro[2H-1-benzopyran-2,2'-indoline]; 3',3'-diethyl-8-methoxy-1'-methyl-6-nitrospiro[2H-1-benzopyran-2,2'-indoline]; 3',3'-diethyl-1'-methyl-6-nitrospiro[2H-1-benzopyran-2,2'-indoline]; 1',3'-diethyl-3'-methyl-4',7',8'-trimethoxyspiro[2H-1-benzopyran-2,2'-indoline]; 7-diethylamino-1',3',3'-trimethylspiro[2H-1-benzopyran-2,2'-indoline]; 5,7-dihydroxy-1',3',3'-trimethylspiro[2H-1-benzopyran-2,2'-indoline]; 6,8-diiodo-1',3',3'-trimethylspiro[2H-1-benzopyran-2,2'-indoline]; 5',8'-dimethoxy-3',3'-dimethyl-1'-ethylspiro[2H-1-benzopyran-2,2'-indoline]; 5,7-dimethoxy-3',3'-dimethyl-5',6-dinitro-1'-isoamylspiro[2H-1-benzopyran-2,2'-indoline]; 5,7-dimethoxy-1',3'-dimethyl-6-nitro-3'-phenylspiro[2H-1-benzopyran-2,2'-indoline]; 5,7-dimethoxy-3',3'-dimethyl-6-nitro-1'-1-phenylspiro[2H-1-benzopyran-2,2'-indoline]; 1',8-dimethoxy-5,6-dinitro-3'-methyl-3'-phenylspiro[2H-1-benzopyran-2,2'-indoline]; 4',7'-dimethoxy-6,8-dinitro-1',3',3'-trimethylspiro[2H-1-benzopyran-2,2'-indoline]; 5,7-dimethoxy-6,8-dinitro-1',3',3'-trimethylspiro[2H-1-benzopyran-2,2'-indoline]; 5',8-dimethoxy-5,6-dinitro-1',3',3'-trimethylspiro[2H-1-benzopyran-2,2'-indoline]; 6',8-dimethoxy-5,6-dinitro-1',3',3'-trimethylspiro[2H-1-benzopyran-2,2'-indoline]; 7',8-dimethoxy5,6-dinitro-1',3',3'-trimethylspiro[2H-1-benzopyran-2,2'-indoline]; 4',7'-dimethoxy-8-ethoxy-1',3',3'-trimethylspiro[2H-1-benzopyran-2,2'-indoline]; 5',7'-dimethoxy-8-ethoxy-1',3',3'-trimethylspiro[2H-1-benzopyran-2,2'-indoline]; 5,7-dimethoxy-4'-fluoro-6-nitro-1',3',3'-trimethylspiro[2H-1-benzopyran-2,2'-indoline]; 5,7-dimethoxy-5'-fluoro-6-nitro-1',3',3'-trimethylspiro[2H-1-benzopyran-2,2'-indoline]; 1',8-dimethoxy-3'-methyl-6-nitro-3'-phenylspiro[2H-1-benzopyran-2,2'-indoline]; 5,7-dimethoxy-6-nitro-7'-phenyl-1',3',3'-trimethylspiro[2H-1-benzopyran-2,2'-indoline]; 4',7'-dimethoxy-6-nitro-1',3',3'-trimethylspiro[2H-1-benzopyran-2,2'-indoline]; 4',7'-dimethoxy-8-nitro-1',3',3'-trimethylspiro[2H-1-benzopyran-2,2'-indoline]; 5',6-dimethoxy-8-nitro-1',3',3'-trimethylspiro[2H-1-benzopyran-2,2'-indoline]; 5,7-dimethoxy-6-nitro-1',3',3'-trimethylspiro[2H-1-benzopyran-2,2'-indoline]; 5',8-dimethoxy-5-nitro-1',3',3'-trimethylspiro[2H-1-benzopyran-2,2'-indoline]; 5',8-dimethoxy-6-nitro-1',3',3'-trimethylspiro[2H-1-benzopyran-2,2'-indoline]; 6,7'-dimethoxy-8-nitro-1',3',3'-trimethylspiro[2H-1-benzopyran-2,2'-indoline]; 7',8-dimethoxy-5-nitro-1',3',3'-trimethylspiro[2H-1-benzopyran-2,2'-indoline]; 7',8-dimethoxy-6-nitro-1',3',3'-trimethylspiro[2H-1-benzopyran-2,2'-indoline]; 5,7-dimethoxy-6-nitro-1',3',3'-trimethyl-4',6',7'-triphenylspiro[2H-1-benzopyran-2,2'-indoline]; 5,7-dimethoxy-1',3',3'-trimethylspiro[2H-1-benzopyran-2,2'-indoline]; 5',8-dimethoxy-1',3',3'-trimethylspiro[2H-1-benzopyran-2,2'-indoline]; 7',8-dimethoxy-1',3',3'-trimethylspiro[2H-1-benzopyran-2,2'-indoline]; 1',3'-dimethyl-6,8-dinitro-3'-ethylspiro[2H-1-benzopyran-2,2'-indoline]; 3',3'-dimethyl-6,8-dinitro-1'-ethylspiro[2H-1-benzopyran-2,2'-indoline]; 3',3'-dimethyl-5,6-dinitro-1'-hexadecyl-8-methoxyspiro[2H-1-benzopyran-2,2'-indoline]; 3',3'-dimethyl -6,8-dinitro-1'-isoamylspiro[2H-1- benzopyran-2,2'-indoline]; 3',3'-dimethyl -5,6-dinitro-1'-isoamyl-8-methoxyspiro[2H-1-benzopyran-2,2'-indoline]; 3',3'-dimethyl-6,8-dinitro-1'-isoamyl-7-methoxyspiro[2H-1-benzopyran-2,2'-indoline]; 1',3'-dimethyl-5,6-dinitro-8-methoxy-3'-phenylspiro[2H-1-benzopyran-2,2'-indoline]; 1',3'-dimethyl-5',6-dinitro-8-methoxy-3'-phenylspiro[2H-1-benzopyran-2,2'-indoline]; 3,3'-dimethyl-5,6-dinitro-8-methoxy-1'-phenylspiro[2H-1-benzopyran-2,2'-indoline]; 3,3'-dimethyl-6,8-dinitro-7-methoxy-1'-phenylspiro[2H-1-benzopyran-2,2'-indoline]; 3',3'-dimethyl-7,8-dinitro-6-methoxy-1'-phenylspiro[2H-1-benzopyran-2,2'-indoline]; 1',3'-dimethyl-6,8-dinitro-3'-phenylspiro[2H-1-benzopyran-2,2'-indoline]; 3',3'-dimethyl-6,8-dinitro-1'-phenylspiro[2H-1-benzopyran-2,2'-indoline]; 3',3'-dimethyl-6,8-dinitro-1'-propylspiro[2H-1-benzopyran-2,2'-indoline]; 1',3'-dimethyl-3',7'-diphenyl-8-methoxy-6-nitrospiro[2H-1-benzopyran-2,2'-indoline]; 3',3'-dimethyl-8-ethoxy-1'-phenylspiro[2H-1-benzopyran-2,2'-indoline]; 1',3'-dimethyl-3'-ethylspiro[2H-1-benzopyran-2,2'-indoline]; 3',3'-dimethyl-1'-ethylspiro[2H-1-benzopyran-2,2'-indoline]; 1',3'-dimethyl-3'-ethyl-8-methoxyspiro[2H-1-benzopyran-2,2'-indoline]; 3',3'-dimethyl-1'-ethyl-8-methoxyspiro[2H-1-benzopyran-2,2'-indoline]; 1',3'-dimethyl-3'-ethyl-6-methoxy-8-nitrospiro[2H-1-benzopyran-2,2'-indoline]; 1',3'-dimethyl-3'-ethyl-8-methoxy-5-nitrospiro[2H-1-benzopyran-2,2'-indoline]; 1',3'-dimethyl-3'-ethyl-8-methoxy-6-nitrospiro[2H-1-benzopyran-2,2'-indoline]; 1',3'-dimethyl-3'-ethyl-8-methoxy-6-nitrospiro[2H-1-benzopyran-2,2'-indoline]; 3',3'-dimethyl-1'-ethyl-8-methoxy-6-nitrospiro[2H-1-benzopyran-2,2'-indoline]; 1',3'-dimethyl-3'-ethyl-6-nitrospiro[2H-1-benzopyran-2,2'-indoline]; 3',3'-dimethyl-1'-ethyl-6-nitrospiro[2H-1-benzopyran-2,2'-indoline]; 3',3'-dimethyl-1'-ethyl-8-nitrospiro[2H-1-benzopyran-2,2'-indoline]; 3',3'-dimethyl-1'-hexadecyl-6-nitrospiro[2H-1-benzopyran-2,2'-indoline]; 3',3'-dimethyl-1'-(β-hydroxyethyl)-6-nitrospiro[2H-1-benzopyran-2,2'-indoline]; 3',3'-dimethyl-1'-isoamyl-8-methoxy-5,5',6-trinitrospiro[2H-1-benzopyran-2,2'-indoline]; 3',3'-dimethyl-1'-isoamyl-6-nitrospiro[2H-1-benzopyran-2,2'-indoline]; 3',3'-dimethyl-1'-isoamyl-5',6,8-trinitrospiro[2H-1-benzopyran-2,2'-indoline]; 3',3'-dimethyl-1'-isopropyl-8-methoxy-6-nitrospiro[2H-1-benzopyran-2,2'-indoline]; 1',3'-dimethyl-6-methoxy-8-nitro-3'-phenylspiro[2H-1-benzopyran-2,2'-indoline]; 1',3'-dimethyl-8-methoxy-6-nitro-3'-phenylspiro[2H-1-benzopyran-2,2'-indoline]; 3',3'-dimethyl-6-methoxy-8-nitro-1'-phenylspiro[2H-1-benzopyran-2,2'-indoline]; 3',3'-dimethyl-7-methoxy-6-nitro-1'-phenylspiro[2H-1-benzopyran-2,2'-indoline]; 3',3'-dimethyl-8-methoxy-5-nitro-1'-phenylspiro[2H-1-benzopyran-2,2'-indoline]; 3',3'-dimethyl-8-methoxy-6-nitro-1'-phenylspiro[2H-1-benzopyran-2,2'-indoline]; 3',3'-dimethyl-8-methoxy-6-nitro-1'-propylspiro[2H-1-benzopyran-2,2'-indoline]; 1',3'-dimethyl-8-methoxy-3'-phenylspiro[2H-1-benzopyran-2,2'-indoline]; 3',3'-dimethyl-8-methoxy-1'-phenylspiro[2H-1-benzopyran-2,2'-indoline]; 3',3'-dimethyl-8-methoxy-1'-propylspiro[2H-1-benzopyran-2,2'-indoline]; 1',3'-dimethyl-6-nitro-3'-phenylspiro[2H-1-benzopyran-2,2'-indoline]; 1',3'-dimethyl-8-nitro-3'-phenylspiro[2H-1-benzopyran-2,2'-indoline]; 3',3'-dimethyl-6-nitro-1'-phenylspiro[2H-1-benzopyran-2,2'-indoline]; 3',3'-dimethyl-1'-phenylspiro[2H-1-benzopyran-2,2'-indoline]; 3',3'-dimethyl-1'-propylspiro[2H-1-benzopyran-2,2'-indoline]; 1'-dimethylamino5,6-dinitro-8-methoxy-3'-methyl-3'-phenylspiro[2H-1-benzopyran-2,2'-indoline]; 1'-dimethylamino-8-methoxy-3'-methyl-6-nitro-3'-phenylspiro[2H-1-benzopyran-2,2'-indoline];

1'-dimethylamino-3'-methyl-6-nitro-3'-phenylspiro[2H-1-benzopyran-2,2'-indoline]; 5,6-dinitro-8-methoxy-1',3',3',4',7'-pentamethylspiro[2H-1-benzopyran-2,2'-indoline]; 5,6-dinitro -8-methoxy-7'-phenyl-1',3',3'-trimethylspiro[2H-1-benzopyran-2,2'-indoline]; 5,6-dinitro-8-methoxy-1',3,3',3'-tetra methylspiro[2H-1-benzopyran-2,2'-indoline]; 5,6-dinitro-8-methoxy-1',3',3',5'-tetramethylspiro[2H-1-benzopyran-2,2'-indoline]; 5,7'-dinitro-8-methoxy-1',3',3'-trimethylspiro[2H-1-benzopyran-2,2'-indoline]; 5,6-dinitro-8-methoxy-1',3',3'-trimethylspiro[2H-1-benzopyran-2,2'-indoline]; 5',8-dinitro-6-methoxy-1',3',3'-trimethylspiro[2H-1-benzopyran2,2'-indoline]; 6,7'-dinitro-8-methoxy-1',3',3'-trimethylspiro[2H-1-benzopyran-2,2'-indoline]; 6,8-dinitro-5'-methoxy-1',3',3'-trimethylspiro[2H-1-benzopyran -2,2'-indoline]; 6,8-dinitro-7-methoxy-1',3',3'-trimethylspiro[2H-1-benzopyran-2,2'-indoline]; 5,6-dinitro-8-methoxy-1',3',3'-trimethyl4',6',7'-triphenylspiro[2H-1-benzopyran-2,2'-indoline]; 6,8-dinitro5'-phenyl-1',3',3'-trimethylspiro[2H-1-benzopyran-2,2'-indoline]; 6,8-dinitro-1',3,3',3'-tetramethylspiro[2H-1-benzopyran-2,2'-indoline]; 6,8-dinitro-1',3',3',7'-tetramethylspiro[2H-1-benzopyran-2,2'-indoline]; 5',6-dinitro-1',3',3'-trimethylspiro[2H-1-benzopyran-2,2'-indoline]; 6,8-dinitro-1',3',3'-trimethylspiro[2H-1-benzopyran-2,2'-indoline]; 4',6'-diphenyl-8-methoxy-6-nitro-1',3',3'-trimethylspiro[2H-1-benzopyran-2,2'-indoline]; 3',3'-diphenyl-1'-methyl-6-nitrospiro[2H-1-benzopyran-2,2'-indoline]; 4',6'-diphenyl-6-nitro-1',3',3'-trimethylspiro[2H-1-benzopyran-2,2'-indoline]; 5',7'-diphenyl-6-nitro-1',3',3'-trimethylspiro[2H-1-benzopyran-2,2'-indoline]; 6-ethoxy-8-nitro-1',3',3'-trimethylspiro[2H-1-benzopyran-2,2'-indoline]; 8-ethoxy-6-nitro-1',3',3'-trimethylspiro[2H-1-benzopyran-2,2'-indoline]; 8-ethoxy-1',3',3',4',7'-pentamethylspiro[2H-1-benzopyran-2,2'-indoline]; 8-ethoxy-5'-phenyl-1',3',3'-trimethylspiro[2H-1-benzopyran-2,2'-indoline]; 8-ethoxy-7'-phenyl-1',3',3'-trimethylspiro[2H-1-benzopyran-2,2'-indoline]; 8-ethoxy-1',3',3'-trimethylspiro[2H-1-benzopyran-2,2'-indoline]; 8-ethoxymethyl-6-nitro-1',3',3'-trimethylspiro[2H-1-benzopyran-2,2'-indoline]; 3'-ethyl-8-methoxy-3'-methyl-1'-phenylspiro[2H-1-benzopyran-2,2'-indoline]; 3'-methyl-6-nitrol-1'-phenylspiro[2H-1-benzopyran- 2,2'-indoline]; 8-ethyl-6-nitro-1',3',3'-trimethylspiro[2H-1-benzopyran-2,2'-indoline]; 4'-fluoro-8-methoxy-6-nitro-1',3',3'-trimethylspiro[2H-1-benzopyran-2,2'-indoline]; 5'-fluoro-6-methoxy-8-nitro-1',3',3'-trimethylspiro[2H-1-benzopyran-2,2'-indoline]; 5'-fluoro-8-methoxy-6-nitro-1',3',3'-trimethylspiro[2H-1-benzopyran-2,2'-indoline]; 4'-fluoro-6-nitro-1',3',3'-trimethylspiro[2H-1-benzopyran-2,2'-indoline]; 5'-fluoro-6-nitro-1',3',3'-trimethylspiro[2H-1-benzopyran-2,2'-indoline]; 6-fluoro-8-nitro-1',3',3'-trimethylspiro[2H-1-benzopyran-2,2'-indoline]; 8-fluoro-6-nitro-1',3',3'-trimethylspiro[2H-1-benzopyran-2,2'-indoline]; 7-fluoro-1',3',3'-trimethylspiro[2H-1-benzopyran-2,2'-indoline]; 8-fluoro-1',3',3'-trimethylspiro[2H-1-benzopyran-2,2'-indoline]; 8-Formyl-7-hydroxy-1',3',3'-trimethylspiro[2H-1-benzopyran-2,2'-indoline]; 6-formyl-8-methoxy-1',3',3'-trimethylspiro[2H-1-benzopyran-2,2'-indoline]; 6-formyl-1',3',3'-trimethylspiro[2H-1-benzopyran-2,2'-indoline]; 8-formyl-1',3',3'-trimethylspiro[2H-1-benzopyran-2,2'-indoline]; 1',3',3',5,5',7-hexamethyl-6-nitrospiro[2H-1-benzopyran-2,2'-indoline]; 1',3',3',5,7,8-hexamethyl-6-nitrospiro[2H-1-benzopyran-2,2'-indoline]; 5'-(β-hydroxyethyl)-8-methoxy-6-nitro-1',3',3'-trimethylspiro[2H-1-benzopyran-2,2'-indoline]; 5'-(β-hydroxyethyl)-8-methoxy-1',3',3'-trimethylspiro[2H-1-benzopyran-2,2'-indoline]; 5'-(β-hydroxyethyl)-6-nitro-1',3',3'-trimethylspiro[2H-1-benzopyran-2,2'-indoline]; 5'-(β-

Hydroxyethyl)-1',3',3'-trimethylspiro[2H-1-benzopyran-2, 2'-indoline]; 6-hydroxy-8-methoxy-1',3',3'-trimethylspiro [2H-1-benzopyran-2,2'-indoline]; 7-hydroxy-5'-nitro-1',3', 3'-trimethylspiro[2H-1-benzopyran-2,2'-indoline]; 7-hydroxy-6-nitro-1',3',3'-trimethylspiro[2H-1-benzopyran-2,2'-indoline]; 6-hydroxy-1',3',3'-trimethylspiro[2H-1-benzopyran-2,2'-indoline]; 7-hydroxy-1',3',3'-trimethylspiro [2H-1-benzopyran-2,2'-indoline]; 8-hydroxy-1',3',3'-trimethylspiro[2H-1-benzopyran-2,2'-indoline]; 8-hydroxymethyl-6-nitro-1',3',3'-trimethylspiro[2H-1-benzopyran-2,2'-indoline]; 6-iodo-8-nitro-1',3',3'-trimethylspiro[2H-1-benzopyran-2,2'-indoline]; 8-iodo-6-nitro-1',3',3'-trimethylspiro[2H-1-benzopyran-2,2'-indoline]; 1'-methoxy-3'-methyl-6-nitro-3'-phenylspiro[2H-1-benzopyran-2,2'-indoline]; 5'-methoxy-6-nitro-1',3',3',5,7-pentamethylspiro[2H-1-benzopyran-2,2'-indoline]; 5'-methoxy-6-nitro-1',3',3',5,8-pentamethylspiro[2H-1-benzopyran-2,2'-indoline]; 7'-methoxy-6-nitro-1',3',3',5,7-pentamethylspiro[2H-1-benzopyran-2,2'-indoline]; 7'-methoxy-6-nitro-1',3',3',5,8-pentamethylspiro[2H-1-benzopyran-2,2'-indoline]; 6- methoxy-8-nitro-5'-phenyl-1', 3',3'-trimethylspiro[2H-1-benzopyran-2,2'-indoline]; 6-methoxy-8-nitro-7'-phenyl-1',3',3'-trimethylspiro[2H-1-benzopyran-2,2'-indoline]; 7- methoxy-6-nitro-7'-phenyl-1', 3',3'-trimethylspiro[2H-1-benzopyran-2,2'-indoline]; 8-methoxy-5-nitro-5'-phenyl-1',3',3'-trimethylspiro[2H-1-benzopyran-2,2'-indoline]; 8-methoxy-5-nitro-7'-phenyl-1', 3',3'-trimethylspiro[2H-1-benzopyran-2,2'-indoline]; 8-methoxy-6-nitro-3-phenyl-1',3',3'-trimethylspiro[2H-1-benzopyran-2,2'-indoline]; 8-methoxy-6-nitro-5'-phenyl-1', 3',3'-trimethylspiro[2H-1-benzopyran-2,2'-indoline]; 8-methoxy-6-nitro-7'-phenyl-1',3',3'-trimethylspiro[2H-1-benzopyran-2,2'-indoline]; 6-methoxy-8-nitro-1',3,3',3'-tetramethylspiro[2H-1-benzopyran-2,2'-indoline]; 6-methoxy-8-nitro-1',3',3',5'-tetramethylspiro[2H-1-benzopyran-2,2'-indoline]; 6-methoxy-8-nitro-1',3',3',6'-tetramethylspiro[2H-1-benzopyran-2,2'-indoline]; 6-methoxy-8-nitro-1',3',3',7'-tetramethylspiro[2H-1-benzopyran-2,2'-indoline]; 7-methoxy-6-nitro-1',3,3',3'-tetramethylspiro[2H-1-benzopyran-2,2'-indoline]; 7-methoxy-6-nitro-1',3',3',5'-tetramethylspiro[2H-1-benzopyran-2,2'-indoline]; 8-methoxy-5-nitro-1',3,3',3'-tetramethylspiro[2H-1-benzopyran-2,2'-indoline]; 8-methoxy-5-nitro-1',3',3',6'-tetramethylspiro[2H-1-benzopyran-2,2'-indoline]; 8-methoxy-5-nitro-1',3',3',7'-tetramethylspiro[2H-1-benzopyran-2,2'-indoline]; 8-methoxy-6-nitro-1',3,3',3'-tetramethylspiro[2H-1-benzopyran-2,2'-indoline]; 8-methoxy-6-nitro-1',3',3',4'-tetramethylspiro[2H-1-benzopyran-2,2'-indoline]; 8-methoxy-6-nitro-1',3',3',5'-tetramethylspiro[2H-1-benzopyran-2,2'-indoline]; 8-methoxy-6-nitro-1',3',3',6'-tetramethylspiro[2H-1-benzopyran-2,2'-indoline]; 8-methoxy-6-nitro-1',3',3',7'-tetramethylspiro[2H-1-benzopyran-2,2'-indoline]; 8-methoxy-6-nitro-1',3',3'-triethylspiro[2H-1-benzopyran-2,2'-indoline]; 5'-methoxy-6-nitro-1',3',3'-trimethylspiro[2H-1-benzopyran-2,2'-indoline]; 5'-methoxy-8-nitro-1',3',3'-trimethylspiro[2H-1-benzopyran-2,2'-indoline]; 6-methoxy-8-nitro-1',3',3'-trimethylspiro[2H-1-benzopyran-2,2'-indoline]; 7-methoxy-6-nitro-1',3',3'-trimethylspiro[2H-1-benzopyran-2,2'-indoline]; 7-methoxy-6-nitro-1',3',3'-trimethylspiro[2H-1-benzopyran- 2,2'-indoline]; 7'-methoxy-8-nitro-1',3',3'-trimethylspiro[2H-1-benzopyran-2,2'-indoline]; 8-methoxy-5-nitro-1',3',3'-trimethylspiro[2H-1-benzopyran-2,2'-indoline]; 8-methoxy-5'-nitro-1',3',3'-trimethylspiro[2H-1-benzopyran-2,2'-indoline]; 8-methoxy-6-nitro-1',3',3'-trimethylspiro[2H-1-benzopyran-2,2'-indoline]; 7-methoxy-6-nitro-1',3',3'-trimethyl-4',6',7'-triphenylspiro[2H-1-benzopyran-2,2'-indoline]; 8-methoxy-6-nitro-1',3',3'-trimethyl-4',6',7'-triphenylspiro[2H-1-benzopyran-2,2'-indoline]; 8-methoxy-1',3',3',4',7'-pentamethylspiro[2H-1-benzopyran-2,2'-indoline]; 8-methoxy-5'-phenyl-1',3',3'-trimethylspiro[2H-1-benzopyran-2,2'-indoline]; 8-methoxy-7'-phenyl-1',3',3'-trimethylspiro[2H-1-benzopyran-2,2'-indoline]; 8-methoxy-1',3,3',3'-tetramethylspiro[2H-1-benzopyran-2,2'-indoiline]; 8-methoxy4',6,7'-trichloro-1',3', 3'-trimethylspiro[2H-1-benzopyran-2,2'-indoline]; 5'-methoxy-1',3',3'-trimethylspiro[2H-1-benzopyran-2,2'-indoline]; 6-methoxy-1',3',3'-trimethylspiro[2H-1-benzopyran-2,2'-indoline]; 7-methoxy-1',3',3'-trimethylspiro[2H-1-benzopyran-2,2'-indoline]; 8-methoxy-1',3',3'-trimethylspiro[2H-1-benzopyran-2,2'-indoline]; 8-methoxy-1',3',3'-trimethyl-5,5',6-trinitrospiro[2H-1-benzopyran-2,2'-indoline]; 6-nitro-1',3',3',5,7-pentamethylspiro[2H-1-benzopyran-2,2'-indoline]; 6-nitro-1',3',3',5,8-pentamethylspiro[2H-1-benzopyran-2,2'-indoline]; 6-(o-nitrophenylazo)-1',3',3'-trimethylspiro[2H-1-benzopyran-2,2'-indoline]; 6-(p-nitrophenylazo)-1',3',3'-trimethylspiro[2H-1-benzopyran-2,2'-indoline]; 6-nitro-5'-phenyl-1',3',3'-trimethylspiro[2H-1-benzopyran-2,2'-indoline]; 6-nitro-7'-phenyl-1',3',3'-trimethylspiro[2H-1-benzopyran-2,2'-indoline]; 8-nitro-5'-phenyl-1',3',3'-trimethylspiro[2H-1-benzopyran-2,2'-indoline]; 8-nitro-7'-phenyl-1',3',3'-trimethylspiro[2H-1-benzopyran-2,2'-indoline]; 6-nitro-8-piperidinomethyl-1',3',3'-trimethylspiro [2H-1-benzopyran-2,2'-indoline]; 7-nitro5,5',6,8-tetrachloro-1',3',3'-trimethylspiro[2H-1-benzopyran-2,2'-indoline]; 6-nitro4',5',6',7'-tetrafluoro-1',3',3'-trimethylspiro [2H-1-benzopyran-2,2'-indoline]; 6-nitro-1',3,3',3'-tetramethylspiro[2H-1-benzopyran-2,2'-indoline]; 6-nitro-1',3',3',5'-tetramethylspiro[2H-1-benzopyran-2,2'-indoline]; 6-nitro-1',3',3',6'-tetramethylspiro[2H-1-benzopyran-2,2'-indoline]; 6-nitro-1',3',3',7'-tetramethylspiro[2H-1-benzopyran-2,2'-indoline]; 6-nitro-1',3',3',8-tetramethylspiro[2H-1-benzopyran-2,2'-indoline]; 8-nitro-1',3,3',3'-tetramethylspiro[2H-1-benzopyran-2,2'-indoline]; 8-nitro-1',3',3',6'-tetramethylspiro[2H-1-benzopyran-2,2'-indoline]; 8-nitro-1',3',3',7'-tetramethylspiro[2H-1-benzopyran-2,2'-indoline]; 5-nitro-5',6,8-trichloro-1',3',3'-trimethylspiro[2H-1-benzopyran-2,2'-indoline]; 6-nitro-5,7', 7-trichloro-1',3',3'-trimethylspiro[2H-1-benzopyran-2,2'-indoline]; 6-nitro-5,5',8-trichloro-1',3',3'-trimethylspiro[2H-1-benzopyran-2,2'-indoline]; 6-nitro5,7,7'-trichloro-1',3',3'-trimethylspiro[2H-1-benzopyran-2,2'-indoline]; 6-nitro-5',7, 8-trichloro-1',3',3'-trimethylspiro[2H-1-benzopyran-2,2'-indoline]; 7-nitro-5,6,8-trichloro-1',3',3'-trimethylspiro[2H-1-benzopyran-2,2'-indoline]; 5-nitro4',7',8-trimethoxy-1',3', 3'-trimethylspiro[2H-1-benzopyran-2,2'-indoline]; 6-nitro4', 6',8-trimethoxy-1',3',3'-trimethylspiro[2H-1-benzopyran-2, 2'-indoline]; 6-nitro4',7',8-trimethoxy-1',3',3'-trimethylspiro [2H-1-benzopyran-2,2'-indoline]; 8-nitro-4',6,7'-trimethoxy-1',3',3'-trimethylspiro[2H-1-benzopyran-2,2'-indoline]; 5-nitro-1',3',3'-trimethylspiro[2H-1-benzopyran-2,2'-indoline]; 5'-nitro-1',3',3'-trimethylspiro[2H-1-benzopyran-2,2'-indoline]; 6-nitro-1',3',3'-trimethylspiro [2H-1-benzopyran-2,2'-indoline]; 7-nitro-1',3',3'-trimethylspiro[2H-1-benzopyran-2,2'-indoline]; 8-nitro-1', 3',3'-trimethylspiro[2H-1-benzopyran-2,2'-indoline]; 6-(β-nitrovinyl)-1',3',3'-trimethylspiro[2H-1-benzopyran-2,2'-indoline]; 6-nitro-1',3',3'-trimethyl-4',6',7'-triphenylspiro [2H-1-benzopyran-2,2'-indoline]; 1',3',3',5,7-pentamethylspiro[2H-1-benzopyran-2,2'-indoline]; 1',3',3', 6,8-pentamethylspiro[2H-1-benzopyran-2,2'-indoline]; 7'-phenyl-1',3',3'-trimethylspiro[2H-1-benzopyran-2,2'- indoline]; 6-phenylazo-1',3',3'-trimethylspiro[2H-1-benzopyran-2,2'-indoline]; 1',3,3',3'-tetramethylspiro[2H1-benzopyran-2,2'-indoline]; 1',3',3',5'-tetramethylspiro[2H-1-benzopyran-2,2'-indoline]; 1',3',3',6-tetramethylspiro[2H-1-benzopyran-2,2'-indoline]; 1',3',3',7'-tetramethylspiro[2H-1-benzopyran-2,2'-indoline]; 1',3',3',8-tetramethylspiro[2H-1-benzopyran-2,2'-indoline]; 5,6,8-trichloro-1',3',3'-trimethylspiro[2H-1-benzopyran-2,2'-indoline]; 4',6',8-trimethoxy-1',3',3'-trimethylspiro[2H-1-benzopyran-2,2'-indoline]; 4',7',8-trimethoxy-1',3',3'-trimethylspiro[2H-1-benzopyran-2,2'-indoline]; 5',7',8-trimethoxy-1',3',3'-trimethylspiro[2H-1-benzopyran-2,2'-indoline]; 1',3',3'-trimethylspiro[2H-1-benzopyran-2,2'-indoline]; 1',3',3'-trimethyl-5',6,8-trinitrospiro[2H-1-benzopyran-2,2'-indoline]; 1',3',3'-trimethyl-4',6',7'-triphenylspiro[2H-1-benzopyran-2,2'-indoline]; spiro[2H-1-benzopyran-2,2'-[1H]-benzo[g]indoline]; 8-methoxy-6-nitro-1',3',3'-trimethylspiro[2H-1-benzopyran-2,2'-[1H]-benzo[g]indoline]; 6-nitro-1',3',3'-trimethylspiro[2H-1-benzopyran-2,2'-[1H]-benzo[g]indoline]; spiro[2H-benzopyran-2,2,-[1H]-benzo[e]indoline]; 6-nitro-1',3',3'-trimethylspiro[2H-benzopyran-2,2,-[1H]-benzo[e]indoline]; spiro[indoline-2,3'-[3H]-naphtho[2,1-b]pyran]; 8'-bromo-1,3,3-trimethylspiro[indoline-2,3'-[3H]-naphtho[2,1-b]pyran]; 1-butyl-3,3-dimethylspiro[indoline-2,3'-[3H]-naphtho[2,1-b]pyran]; 1-butyl-3,3-dimethyl-8-nitrospiro[indoline-2,3'-[3H]-naphtho[2,1-b]pyran]; 5'-carboxy-5-chloro-1,3,3-trimethylspiro[indoline-2,3'- [3H]-naphtho[2,1-b]pyran]; 5'-carboxy-1,3,3-trimethylspiro[indoline-2,3'-[3H]-naphtho[2,1-b]pyran]; 5-chloro-1,3,3-trimethylspiro[indoline-2,3'-[3H]-naphtho[2,1-b]pyran]; 5-chloro-8'-nitro-1,3,3-trimethylspiro[indoline-2,3'-[3H]-naphtho[2,1-b]pyran]; 4,7-dimethoxy-1,3,3-trimethylspiro[indoline-2,3'-[3H]-naphtho[2,1-b]pyran]; 1,3-dimethyl-3-ethylspiro[indoline-2,3'-[3H]-naphtho[2,1-b]pyran]; 3,3-dimethyl-1-ethylspiro[indoline-2,3'-[3H]-naphtho[2,1-b]pyran]; 3,3-dimethyl-1-ethyl-8'-nitrospiro[indoline-2,3'-[3H]-naphtho[2,1-b]pyran]; 3,3-dimethyl-1-propylspiro[indoline-2,3'-[3H]-naphtho[2,1-b]pyran]; 3,3-dimethyl-1-propyl-8'-nitrospiro[indoline-2,3'-[3H]-naphtho[2,1-b]pyran]; 9'-hydroxy-1,3,3-trimethylspiro[indoline-2,3'-[3H]-naphtho[2,1-b]pyran]; 5-(β-hydroxyethyl)-1,3,3-trimethylspiro[indoline-2,3'-[3H]-naphtho[2,1-b]pyran]; 5-methoxy-8'-nitro-1,3,3-trimethylspiro[indoline-2,3'-[3H]-naphtho[2,1-b]pyran]; 5'-methoxy-8'-nitro-1,3,3-trimethylspiro[indoline-2,3'-[3H]-naphtho[2,1-b]pyran]; 5'-methoxy-10'-nitro-1,3,3-trimethylspiro[indoline-2,3'-[3H]-naphtho[2,1-b]pyran]; 5-methoxy-1,3,3-trimethylspiro[indoline-2,3'-[3H]-naphtho[2,1-b]pyran]; 5'-methoxy-1,3,3-trimethylspiro[indoline-2,3'-[3H]-naphtho[2,1-b]pyran]; 7'-nitro-1,3,3-trimethylspiro[indoline-2,3'-[3H]-naphtho[2,1-b]pyran]; 8'-nitro-1,3,3-trimethylspiro[indoline-2,3'-[3H]-naphtho[2,1-b]pyran]; 10'-nitro-1,3,3-trimethylspiro[indoline-2,3'-[3H]-naphtho[2,1-b]pyran]; 1,3,3,4,7-pentamethylspiro[indoline-2,3'-[3H]-naphtho[2,1-b]pyran]; 1,3,3,5,7-pentamethylspiro[indoline-2,3'-[3H]-naphtho[2,1-b]pyran]; 5-phenyl-1,3,3-trimethylspiro[indoline-2,3'-[3H]-naphtho[2,1-b]pyran]; 7-phenyl-1,3,3-trimethylspiro[indoline-2,3'-[3H]-naphtho[2,1-b]pyran]; 1,2',3,3-tetramethylspiro[indoline-2,3'-[3H]-naphtho[2,1-b]pyran]; 1,3,3,5-tetramethylspiro[indoline-2,3'-[3H]-naphtho[2,1-b]pyran]; 1,3,3,7-tetramethylspiro[indoline-2,3'-[3H]-naphtho[2,1-b]pyran]; 1,3,3,-trimethylspiro[indoline-2,3'-[3H]-naphtho[2,1-b]pyran]; spiro[indoline-2,2'-[2H]-phenanthro[2,1-b]pyran]; 1,3,3,-trimethylspiro[indoline-2,2'-[2H]-phenanthro[2,1-b]pyran]; spiro[3H-anthra[2,1-b]pyran-3,2'-indoline]; 1',3',3'-trimethylspiro[3H-anthra[2,1b]pyran-3,2'-indoline]; spiro[indoline-2,3'-(3H]-phenanthro[3,4-b]pyran]; 1,3,3-trimethylspiro[indoline-2,3'-(3H]-phenanthro[3,4-b]pyran]; spiro[indoline-2,2'-[2H]-naphtho[1,2-b]pyran]; 6'-chloro-1,3,3-trimethylspiro[indoline-2,2'-[2H]-naphtho[1,2-b]pyran]; 6'-nitro-1,3,3-trimethylspiro[indoline-2,2'-[2H]-naphtho[1,2-b]pyran]; 1,3,3-trimethylspiro[indoline-2,2'-[2H]-naphtho[1,2-b]pyran]; spiro[indoline-2,2'-[2H]-naphtho[2,3-b]pyran]; 10'-nitro-1,3,3-trimethylspiro[indoline-2,2'-[2H]-naphtho[2,3-b]pyran]; 1,3,3-trimethylspiro[indoline-2,2'-[2H]-naphtho[2,3-b]pyran]; spiro[2H-1-benzopyran-2,2'-benzothiazoline]; 6'-acetamido-3,3'-dimethyl-6-nitrospiro[2H-1-benzopyran-2,2'-benzothiazoline]; 6'-amino-3,3'-dimethyl-6-nitrospiro[2H-1-benzopyran-2,2'-benzothiazoline]; 6-bromo-3,3'-dimethylspiro[2H-1-benzopyran-2,2'-benzothiazoline]; 6-bromo-3,3'-dimethyl-6'-methoxyspiro[2H-1-benzopyran-2,2'-benzothiazoline]; 6'-bromo-3,3'-dimethyl-8-methoxy-6-nitrospiro[2H-1-benzopyran-2,2'-benzothiazoline]; 6-bromo-3,3'-dimethyl-6'-methylthiospiro[2H-1-benzopyran-2,2'-benzothiazoline]; 6-bromo-3,3'-dimethyl-6'-nitrospiro[2H-1-benzopyran-2,2'-benzothiazoline]; 8-bromo-3,3'-dimethyl-6-nitrospiro[2H-1-benzopyran-2,2'-benzothiazoline]; 6-bromo-3'-methylspiro[2H-1-benzopyran-2,2'-benzothiazoline]; 3'-butyl-6-nitro-3-phenylspiro[2H-1-benzopyran-2,2'-benzothiazoline]; 8-carbethoxy-3,3'-dimethylspiro[2H-1-benzopyran-2,2'-benzothiazoline]; 8-carbethoxy-3,3'-dimethyl-6-nitrospiro[2H-1-benzopyran-2,2'-benzothiazoline]; 8-carboxy-3,3'-dimethylspiro[2H-1-benzopyran-2,2'-benzothiazoline]; 6'-carboxy-3,3'-dimethyl-8-methoxy-6-nitrospiro[2H-1-benzopyran-2,2'-benzothiazoline]; 8-carboxy-3,3'-dimethyl-6-nitrospiro[2H-1-benzopyran-2,2'-benzothiazoline]; 6'-chloro-3,3'-dimethyl-8-methoxy-6-nitrospiro[2H-1-benzopyran-2,2'-benzothiazoline]; 6-chloro-3,3'-dimethyl-8-nitrospiro[2H-1-benzopyran-2,2'-benzothiazoline]; 3-(p-chlorophenyl)-8-methoxy-3'-methyl-6-nitrospiro[2H-1-benzopyran-2,2'-benzothiazoline]; 6'-cyano-3,3'-dimethyl-8-methoxy-6-nitrospiro[2H-1-benzopyran-2,2'-benzothiazoline]; 6,6'-dibromo-3,3'-dimethylspiro[2H-1-benzopyran-2,2'-benzothiazoline]; 6',8-dimethoxy-3,3'-dimethylspiro[2H-1-benzopyran-2,2'-benzothiazoline]; 6',8-dimethoxy-3,3'-dimethyl-6,7'-dinitrospiro[2H-1-benzopyran-2,2'-benzothiazoline]; 6',8-dimethoxy-3,3'-dimethyl-6-nitrospiro[2H-1-benzopyran-2,2'-benzothiazoline]; 6',8-dimethoxy-3'-ethyl-3-methyl-6-nitrospiro[2H-1-benzopyran-2,2'-benzothiazoline]; 3,3'-dimethylspiro[2H-1-benzopyran-2,2'-benzothiazoline]; 3,3'-dimethyl-6,6'-dinitrospiro[2H-1-benzopyran-2,2'-benzothiazoline]; 3,3'-dimethyl-6,6'-dinitro-8-methoxyspiro[2H-1-benzopyran-2,2'-benzothiazoline]; 3,3'-dimethyl-6'-hydroxy-8-methoxy-6-nitrospiro[2H-1-benzopyran-2,2'-benzothiazoline]; 3,3'-dimethyl-5'-isobutyramido-6-nitrospiro[2H-1-benzopyran-2,2'-benzothiazoline]; 3,3'-dimethyl-5'-methacrylamido-6-nitrospiro[2H-1-benzopyran-2,2'-benzothiazoline]; 3,3'-dimethyl-8-methoxyspiro[2H-1-benzopyran-2,2'-benzothiazoline]; 3,3'-dimethyl-8-methoxy-6'-methylthio-6-nitrospiro[2H-1-benzopyran-2,2'-benzothiazoline]; 3,3'-dimethyl-6'-methoxy-6-nitrospiro[2H-1-benzopyran-2,2'-benzothiazoline]; 3,3'-dimethyl-8-methoxy-5-nitrospiro[2H-1-benzopyran-2,2'-benzothiazoline]; 3,3'-dimethyl-8-methoxy-6-nitrospiro[2H-1-benzopyran-2,2'-benzothiazoline]; 3,3'-dimethyl-6'-methylthio-6-nitrospiro[2H-1-benzopyran-2,2'-benzothiazoline]; 3,3'-dimethyl-6-nitrospiro[2H-1-benzopyran-2,2'-benzothiazoline]; 3,3'-dimethyl-8-nitrospiro[2H-1-benzopyran-2,2'-benzothiazoline]; 3'-ethyl-8-methoxy-3-methylspiro[2H-1- benzopyran-2,2'-benzothiazoline]; 3-ethyl-8-methoxy-3'-methyl-6-nitrospiro[2H-1-benzopyran-2,2'-benzothiazoline]; 3'-ethyl-6'-methoxy-3-methyl-6-nitrospiro[2H-1-benzopyran-2,2'-benzothiazoline]; 3'-ethyl-8-methoxy-3-methyl-6-nitrospiro[2H-1-benzopyran-2,2'-benzothiazoline]; 3-ethyl-3'-methyl-6-nitrospiro[2H-1-benzopyran-2,2'-benzothiazoline]; 3'-ethyl-3-methyl-6-nitrospiro[2H-1-benzopyran-2,2'-benzothiazoline]; 3'-ethyl-8-methoxy-6-nitro-3-phenylspiro[2H-1-benzopyran-2,2'-benzothiazoline]; 3'-ethyl-6-nitrospiro[2H-1-benzopyran-2,2'-benzothiazoline]; 3'-ethyl-6-nitro-3-phenylspiro[2H-1-benzopyran-2,2'-benzothiazoline]; 3-isopropyl-8-methoxy-3'-methyl-6-nitrospiro[2H-1-benzopyran-2,2'-benzothiazoline]; 3'-isopropyl-8-methoxy-3-methyl-6-nitrospiro[2H-1-benzopyran-2,2'-benzothiazoline]; 7-methoxy-3'-methylspiro[2H-1-benzopyran-2,2'-benzothiazoline]; 8-methoxy-3'-methyl-6-nitro-3-phenylspiro[2H-1-benzopyran-2,2'-benzothiazoline]; 8-methoxy-3'-methyl-6-nitro-3-propylspiro[2H-1-benzopyran-2,2'-benzothiazoline]; 3'-methylspiro[2H-1-benzopyran-2,2'-benzothiazoline]; 3'-methyl-6-nitrospiro[2H-1-benzopyran-2,2'-benzothiazoline]; 3'-methyl-6-nitro-3-phenylspiro[2H-1-benzopyran-2,2'-benzothiazoline]; 3'-methyl-6-nitro-3-propylspiro[2H-1-benzopyran-2,2'-benzothiazoline]; 6-nitro-3-phenyl-3'-propylspiro[2H-1-benzopyran-2,2'-benzothiazoline]; spiro[benzothiazoline-2,3,'-[3H]naphtho[2,1-b]pyran]; 2',3-dimethylspiro[benzothiazoline-2,3,'-[3H]-naphtho[2,1-b]pyran]; 2',3-dimethyl-6-methoxyspiro[benzothiazoline-2,3,'-[3H]-naphtho[2,1-b]pyran]; 3-ethylspiro[benzothiazoline-2,3,'-[3H]naphtho[2,1-b]pyran]; 3-ethyl-2'-methylspiro[benzothiazoline-2,3,'-[3H]naphtho[2,1-b]pyran]; 3-methylspiro[benzothiazoline-2,3,'-[3H]naphtho[2,1-b]pyran]; spiro[2H-1-benzopyran-2,2'-benzoxazoline]; 8-bromo-3'-methyl-6-nitrospiro[2H-1-benzopyran-2,2'-benzoxazoline]; 5'-chloro-3,3'-dimethyl-6-nitrospiro[2H-1-benzopyran-2,2'-benzoxazoline]; 6-chloro-3,3'-dimethyl-8-nitrospiro[2H-1-benzopyran-2,2'-benzoxazoline]; 3,3'-dimethyl-6-methoxy-8-nitrospiro[2H-1-benzopyran-2,2'-benzoxazoline]; 3,3'-dimethyl-8-methoxy-6-nitrospiro[2H-1-benzopyran-2,2'-benzoxazoline]; 3,3'-dimethyl-8-methoxy-6-nitro-5'-phenylspiro[2H-1-benzopyran-2,2'-benzoxazoline]; 3,3'-dimethyl-6-nitrospiro[2H-1-benzopyran-2,2'-benzoxazoline]; 3,3'-dimethyl-8-nitrospiro[2H-1-benzopyran-2,2'-benzoxazoline]; 3,3'-dimethyl-6-nitro-5'-phenylspiro[2H-1-benzopyran-2,2'-benzoxazoline]; 3-ethyl-3'-methyl-6-nitrospiro[2H-1-benzopyran-2,2'-benzoxazoline]; 8-methoxy-6-nitro-3,3',5',7'-tetramethylspiro[2H-1-benzopyran-2,2'-benzoxazoline]; 8-methoxy-6-nitro-3,3',5'-trimethylspiro[2H-1-benzopyran-2,2'-benzoxazoline]; 6-nitro-3,3',5'-trimethylspiro[2H-1-benzopyran-2,2'-benzoxazoline]; 8-nitro-3,3',5'-trimethylspiro[2H-1-benzopyran-2,2'-benzoxazoline]; spiro[2H-1-benzopyran-2,2'-naphth[2,3-d]oxazoline]; 3,3'-dimethyl-8-methoxy-6-nitrospiro[2H-1-benzopyran-2,2'-naphth[2,3-d]oxazoline]; 3,3'-dimethyl-6-nitrospiro[2H-1-benzopyran-2,2'-naphth[2,3-d]oxazoline]; spiro[2H-1-benzopyran-2,2'-naphth[2,1-d]oxazoline]; 3,3'-dimethyl-8-methoxy-6-nitrospiro[2H-1-benzopyran-2,2'-naphth[2,1-d]oxazoline]; 2,2'-spirobi[2H-1-benzopyran]; 3-amyl-2,2'-spirobi[2H-1-benzopyran]; 3-amyl-6'-bromo-2,2'-spirobi[2H-1-benzopyran]; 3-amyl-6-bromo-6'-methyl-2,2'-spirobi[2H-1-benzopyran]; 3-amyl-6'-bromo-6-methyl-2,2'-spirobi[2H-1-benzopyran]; 3-amyl-6,6'-dibromo-2,2'-spirobi[2H-1-benzopyran]; 3-amyl-6,6'-dimethyl-2,2'-spirobi[2H-1-benzopyran]; 3-amyl-6-methyl-2,2'-spirobi[2H-1-benzopyran]; 5-bromo-8,8'-dimethoxy-6-nitro-3'-phenyl-2,2'-spirobi[2H-1-benzopyran]; 6-bromo-6'-nitro-3-phenyl-2,2'-spirobi[2H-1-benzopyran]; 6-bromo-3'-phenyl-2,2'-spirobi[2H-1-benzopyran]; 3-benzyl-2,2'-spirobi[2H-1-benzopyran]; 3-butyl-2,2'-spirobi[2H-1-benzopyran]; 6-chloro-6'-nitro-3-phenyl-2,2'-spirobi[2H-1-benzopyran]; 8-chloro-6-nitro-3'-phenyl-2,2'-spirobi[2H-1-benzopyran]; 6,6'-dibromo-3,3'-dimethylene-2,2'-spirobi[2H-1-benzopyran]; 8,8'-dimethoxy-6'-nitro-3-phenyl-2,2'-spirobi[2H-1-benzopyran]; 3,3'-dimethyl-2,2'-spirobi[2H-1-benzopyran]; 6,6-dimethyl-3',3'-dimethylene-2,2'-spirobi[2H-1-benzopyran]; 3,3'-dimethylene-2,2'-spirobi[2H-1-benzopyran]; 6,6'-dinitro-3,3'-diphenyl-2,2'-spirobi[2H-1-benzopyran]; 3,3'-diphenyl-2,2'-spirobi[2H-1-benzopyran]; 3-ethyl-2,2'-spirobi[2H-1-benzopyran]; 8-fluoro-6-nitro-3'-phenyl-2,2'-spirobi[2H-1-benzopyran]; 8-iodo-6-nitro-3'-phenyl-2,2'-spirobi[2H-1-benzopyran]; 8'-methoxy-3-methyl-6-nitro-2,2'-spirobi[2H-1-benzopyran]; 8-methoxy-6-nitro-3'-phenyl-2,2'-spirobi[2H-1-benzopyran]; 8-methoxy-6'-nitro-3-phenyl-2,2'-spirobi[2H-1-benzopyran]; 8-methoxy-8'-nitro-3-phenyl-2,2'-spirobi[2H-1-benzopyran]; 8'-methoxy-6-nitro-3-phenyl-2,2'-spirobi[2H-1-benzopyran]; 3-methyl-2,2'-spirobi[2H-1-benzopyran]; 3-methyl-6-nitro-2,2'-spirobi[2H-1-benzopyran]; 6-nitro-3'-phenyl-2,2'-spirobi[2H-1-benzopyran]; 3-phenyl-2,2'-spirobi[2H-1-benzopyran]; 3,3'-tetramethylene-2,2'-spirobi[2H-1-benzopyran]; 3,3'-trimethylene-2,2'-spirobi[2H-1-benzopyran]; 3,3'-spirobi[3H-naphtho[2,1-b]pyran]; 2-amyl-3,3'-spirobi[3H-naphtho[2,1-b]pyran]; 2-benzyl-3,3'-spirobi[3H-naphtho[2,1-b]pyran]; 2-butyl-3,3'-spirobi[3H-naphtho[2,1-b]pyran]; 2-chloro-3,3'-spirobi[3H-naphtho[2,1-b]pyran]; 2-chloro-8,8'-dinitro-3,3'-spirobi[3H-naphtho[2,1-b]pyran]; 2-decyl-3,3'-spirobi[3H-naphtho[2,1-b]pyran]; 8,8'-dibromo-3,3'-spirobi[3H-naphtho[2,1-b]pyran]; 2,2'-dicarboethoxy-3,3'-spirobi[3H-naphtho[2,1-b]pyran]; 2,2'-dicarbomethoxy-3,3'-spirobi[3H-naphtho[2,1-b]pyran]; 2,2'-diethyl-3,3'-spirobi[3H-naphtho[2,1-b]pyran]; 5,5'-dimethoxy-3,3'-spirobi[3H-naphtho[2,1b]pyran]; 5,5'-dimethoxy-8,8'-dinitro-3,3'-spirobi[3H-naphtho[2,1-b]pyran]; 5,5'-dimethoxy-10,10'-dinitro-3,3'-spirobi[3H-naphtho[2,1-b]pyran]; 9,9'-dimethoxy-8,8'-dinitro-3,3'-spirobi[3H-naphtho[2,1-b]pyran]; 2,2'-dimethyl-3,3'-spirobi[3H-naphtho[2,1-b]pyran]; 2,2'-dimethyl-8,8'-dinitro-3,3'-spirobi[3H-naphtho[2,1-b]pyran]; 5,5'-dimethyl-10,10'-dinitro-3,3'-spirobi[3H-naphtho[2,1-b]pyran]; 9,9'-dimethyl-8,8'-dinitro-3,3'-spirobi[3H-naphtho[2,1-b]pyran]; 9,9-dimethyl-7,7'-dinitro-3,3'-spirobi[3H -naphtho[2,1-b]pyran]; 2-(Y,Y-dimethylallyl)-3,3'-spirobi[3H-naphtho[2,1-b]pyran]; 2,2'-dimethylene-3,3'-spirobi[3H-naphtho[2,1-b]pyran]; 7,7'-dinitro-3,3'-spirobi[3H-naphtho[2,1-b]pyran]; 8,8'-dinitro-3,3'-spirobi[3H-naphtho[2,1-b]pyran]; 9,9'-dinitro-3,3'-spirobi[3H-naphtho[2,1-b]pyran]; 10,10'-dinitro-3,3'-spirobi[3H-naphtho[2,1-b]pyran]; 8,8'-dinitro-2-methyl-3,3'-spirobi[3H-naphtho[2,1-b]pyran]; 8,8'-dinitro-2,2'-(2"methyl)trimethylene-3,3'-spirobi[3H-naphtho[2,1-b]pyran]; 8,8'-dinitro-2-phenyl-3,3'-spirobi[3H-naphtho[2,1-b]pyran]; 8,8'-dinitro-2,2'-trimethylene-3,3'-spirobi[3H-naphtho[2,1-b]pyran]; 2,2'-diphenyl-3,3'-spirobi[3H-naphtho[2,1-b]pyran]; 2-ethyl-3,3'-spirobi[3H-naphtho[2,1-b]pyran]; 2-heptyl-3,3'-spirobi[3H-naphtho[2,1-b]pyran]; 2-hexyl-3,3'-spirobi[3H-naphtho[2,1-b]pyran]; 2-isobutyl-3,3'-spirobi[3H-naphtho[2,1-b]pyran]; 2-isopropyl-3,3'-spirobi[3H-naphtho[2,1-b]pyran]; 2-methyl-3,3'-spirobi[3H-naphtho[2,1-b]pyran]; 2,2'-(2"-methyl)trimethylene-3,3'-spirobi[3H-naphtho[2,1-b]pyran]; 8'-nitro-2-phenyl-3,3'-spirobi[3H-naphtho[2,1-b]pyran]; 2-octyl-3,3'-spirobi[3H-naphtho[2,1-b]pyran]; 2-phenyl-3,3'-spirobi[3H-naphtho[2, 1-b]pyran]; 2-(β-phenylethyl)-3,3'-spirobi[3H-naphtho[2,1-b]pyran]; 2-propyl-3,3'-spirobi[3H-naphtho[2,1-b]pyran]; 2,2'-tetramethylene-3,3'-spirobi[3H-naphtho[2,1-b]pyran]; 2,2'-trimethylene-3,3'-spirobi[3H-naphtho[2,1-b]pyran]; 2,2'-spirobi[2H-naphtho[1,2-b]pyran]; 3-amyl-2,2'-spirobi[2H-naphtho[1,2-b]pyran]; 6,6'-dichloro-2,2'-spirobi[2H-naphtho[1,2-b]pyran]; 7,7'-dinitro-2,2'-spirobi[2H-naphtho[1,2-b]pyran]; 8,8'-dinitro-2,2'-spirobi[2H-naphtho[1,2-b]pyran]; 9,9'-dinitro-2,2'-spirobi[2H-naphtho[1,2-b]pyran]; 10,10'-dinitro-2,2'-spirobi[2H-naphtho[1,2-b]pyran]; 3-phenyl-2,2'-spirobi[2H-naphtho[1,2-b]pyran]; 2,2'-spirobi[2H-naphtho[2,3-b]pyran]; spiro[2H-1-benzopyran-2,3'-[3H]-naphtho[2,1-b]pyran]; 2'-amylspiro[2H-1-benzopyran-2,3'-[3H]-naphtho[2,1-b]pyran]; 3-amylspiro[2H-1-benzopyran-2,3'-[3H]-naphtho[2,1-b]pyran]; 3-amyl-6-bromospiro[2H-1-benzopyran-2,3'-[3H]-naphtho[2,1-b]pyran]; 3-amyl-7-chlorospiro[2H-1-benzopyran-2,3'-[3H]-naphtho[2,1-b]pyran]; 3-amyl-6-hydroxyspiro[2H-1-benzopyran-2,3'-[3H]-naphtho[2,1-b]pyran]; 3-amyl-6-methoxyspiro[2H-1-benzopyran-2,3'-[3H]-naphtho[2,1-b]pyran]; 3-amyl-7-methoxyspiro[2H-1-benzopyran-2,3'-[3H]-naphtho[2,1-b]pyran]; 3-amyl-6-methylspiro[2H-1-benzopyran-2,3'-[3H]-naphtho[2,1-b]pyran]; 3-amyl-7-methylspiro[2H-1-benzopyran-2,3'-[3H]-naphtho[2,1-b]pyran]; 3-amyl-6-nitrospiro[2H-1-benzopyran-2,3'-[3H]-naphtho[2,1-b]pyran]; 2'-benzylspiro[2H-1-benzopyran-2,3'-[3H]-naphtho[2,1-b]pyran]; 3-benzylspiro[2H-1-benzopyran-2,3'-[3H]-naphtho[2,1-b]pyran]; 6-bromospiro[2H-1-benzopyran-2,3'-[3H]-naphtho[2,1-b]pyran]; 6-bromo-8-methoxy-3-methyl-8'-nitrospiro[2H-1-benzopyran-2,3'-[3H]-naphtho[2,1-b]pyran]; 8'-bromo-8-methoxy-3-phenylspiro[2H-1-benzopyran-2,3'-[3H]-naphtho[2,1-b]pyran]; 6-bromo-3-methyl-8'-nitrospiro[2H-1-benzopyran-2,3'-[3H]-naphtho[2,1-b]pyran]; 6-bromo-8'-nitro-3-phenylspiro[2H-1-benzopyran-2,3'-[3H]-naphtho[2,1-b]pyran]; 8'-bromo-3-phenylspiro[2H-1-benzopyran-2,3'-[3H]-naphtho[2,1-b]pyran]; 6-chloro-8-methoxy-3-methyl-8'-nitrospiro[2H-1-benzopyran-2,3'-[3H]-naphtho[2,1-b]pyran]; 6-chloro-3-methylspiro[2H-1-benzopyran-2,3'-[3H]-naphtho[2,1-b]pyran]; 6-chloro-3-methyl-8'-nitrospiro[2H-1-benzopyran-2,3'-[3H]-naphtho[2,1-b]pyran]; 8-chloro-3-methyl-8'-nitrospiro[2H-1-benzopyran-2,3'-[3H]-naphtho[2,1-b]pyran]; 6-chloro-8'-nitro-3-phenylspiro[2H-1-benzopyran-2,3'-[3H]-naphtho[2,1-b]pyran]; 7-diethylamino-3-methyl-8'nitrospiro[2H-1-benzopyran-2,3'-[3H]-naphtho[2,1-b]pyran]; 5,7-dimethoxy-8'-nitro-3-phenylspiro[2H-1-benzopyran-2,3'-[3H]-naphtho[2,1-b]pyran]; 2',3-dimethylspiro[2H-1-benzopyran-2,3'-[3H]-naphtho[2,1-b]pyran]; 2',3'-dimethylenespiro[2H-1-benzopyran-2,3'-[3H]-naphtho[2,1-b]pyran]; 6-fluoro-3-methyl-8'-nitrospiro[2H-1-benzopyran-2,3'-[3H]-naphtho[2,1-b]pyran]; 2-isopropylspiro[2H-1-benzopyran-2,3'-[3H]-naphtho[2,1-b]pyran]; 3-isopropylspiro[2H-1-benzopyran-2,3'-[3H]-naphtho[2,1-b]pyran]; 8-methoxy-2'-methylspiro[2H-1-benzopyran-2,3'-[3H]-naphtho[2,1-b]pyran]; 8-methoxy-2'-methyl-8'-nitrospiro[2H-1-benzopyran-2,3'-[3H]-naphtho[2,1-b]pyran]; 8-methoxy-3-methyl-6-nitrospiro[2H-1-benzopyran-2,3'-[3H]-naphtho[2,1-b]pyran]; 8-methoxy-3-methyl-8'-nitrospiro[2H-1-benzopyran-2,3'-[3H]-naphtho[2,1-b]pyran]; 7-methoxy-2'-methyl-4-phenylspiro[2H-1-benzopyran-2,3'-[3H]-naphtho[2,1-b]pyran]; 7-methoxy-3-methyl-4-phenylspiro[2H-1-benzopyran-2,3'-[3H]-naphtho[2,1-b]pyran]; 8-methoxy-8'-nitro-3-phenylspiro[2H-1-benzopyran-2,3'-[3H]-naphtho[2,1-b]pyran]; 2'-methylspiro[2H-1-benzopyran-2,3'-[3H]-naphtho[2,1-b]pyran]; 3methylspiro[2H-1-benzopyran-2,3'-[3H]-naphtho[2,1-b]pyran]; 6methylspiro[2H-1-benzopyran-2,3'-[3H]-naphtho[2,1-b]pyran]; 3-methyl-6-nitrospiro[2H-1-benzopyran-2,3'-[3H]-naphtho[2,1-b]pyran]; 2'-methyl-4-phenylspiro[2H-1-benzopyran-2,3'-[3H]-naphtho[2,1-b]pyran]; 8'-nitro-3-(o-nitrophenyl)spiro[2H-1-benzopyran-2,3'-[3H]-naphtho[2,1-b]pyran]; 8'-nitro-3-phenylspiro[2H-1-benzopyran-2,3'-[3H]-naphtho[2,1-b]pyran]; 2'-octylspiro[2H-1-benzopyran-2,3'-[3H]-naphtho[2,1-b]pyran]; 2'-phenylspiro[2H-1-benzopyran-2,3'-[3H]-naphtho[2,1-b]pyran]; 3-phenylspiro[2H-1-benzopyran-2,3'-[3H]-naphtho[2,1-b]pyran]; 2'-(β-phenylethyl)spiro[2H-1-benzopyran-2,3'-[3H]-naphtho[2,1-b]pyran]; 3-(β-phenylethyl)spiro[2H-1-benzopyran-2,3'-[3H]-naphtho[2,1-b]pyran]; 2',3-trimethylenespiro[2H-1-benzopyran-2,3'-[3H]-naphtho[2,1-b]pyran]; spiro[2H-1-benzopyran-2,2'-[2H]-naphtho[1,2-b]pyran]; 3-amylspiro[2H-1-benzopyran-2,2'-[2H]-naphtho[1,2-b]pyran]; 3'-amylspiro[2H-1-benzopyran-2,2'-[2H]-naphtho[1,2-b]pyran]; 3-amyl-6-bromospiro[2H-1-benzopyran-2,2'-[2H]-naphtho[1,2-b]pyran]; 3-amyl-6-methoxyspiro[2H-1-benzopyran-2,2'-[2H]-naphtho[1,2-b]pyran]; 3-amyl-6-methylspiro[2H-1-benzopyran-2,2'-[2H]-naphtho[1,2-b]pyran]; 3-amyl-6-nitrospiro[2H-1-benzopyran-2,2'-[2H]-naphtho[1,2-b]pyran]; 6'-chloro-8-methoxy-3-phenylspiro[2H-1-benzopyran-2,2'-[2H]-naphtho[1,2-b]pyran]; 3'-methyl-4'-phenylspiro[2H-1-benzopyran-2,2'-[2H]-naphtho[1,2-b]pyran]; 3-phenylspiro[2H-1-benzopyran-2,2'-[2H]-naphtho[1,2-b]pyran]; 3'-phenylspiro[2H-1-benzopyran-2,2'-[2H]-naphtho[1,2-b]pyran]; spiro[3H-anthraceno[2,1-b]pyran-3,2'-[2H]-1-benzopyran]; spiro[2H-1-benzopyran-2,2'-[2'H]phenanthreno[2,1-b]pyran]; spiro[3H-anthraceno[2,1-b]pyran-3,3'-[3H]naphtho[2,1-b]pyran]; spiro[3H-naphtho[2,1-b]pyran-3,2'-[2'H]phenanthreno[2,1-b]pyran]; 2,2'-spirobi[2H-phenanthreno[2,1-b]pyran]; spiro[4H-1-benzopyran-4,3'-[3H]naphtho[2,1-b]pyran]; 2,3-diphenyl-7-methoxyspiro[4H-1-benzopyran-4,3'-[3H]naphtho[2,1-b]pyran]; 2,3-diphenyl-7-methoxy-8'-nitrospiro[4H-1-benzopyran-4,3'-[3H]naphtho[2,1-b]pyran]; 2,3-diphenyl-8'-nitrospiro[4H-1-benzopyran-4,3'-[3H]naphtho[2,1-b]pyran]; 7-methoxy-3-methyl-8'-nitro-2-phenylspiro[4H-1-benzopyran-4,3'-[3H]naphtho[2,1-b]pyran]; 6-methoxy-3-methyl-2-phenylspiro[4H-1-benzopyran-4,3'-[3H]naphtho[2,1-b]pyran]; 7-methoxy-3-methyl-2-phenylspiro[4H-1-benzopyran-4,3'-[3H]naphtho[2,1-b]pyran]; 3-(p-methoxyphenyl)-8'-nitro-2-phenylspiro[4H-1-benzopyran-4,3'-[3H]-naphtho[2,1-b]pyran]; 3-methyl-2-phenylspiro[4H-1-benzopyran-4,3'-[3H]naphtho[2,1-b]pyran]; spiro[2H-naphtho[1,2-b]pyran-2,3'-[3H]-naphtho[2,1-b]pyran]; 2'-amylspiro[2H-naphtho[1,2-b]pyran-2,3'-[3H]-naphtho[2,1-b]pyran]; 3-amylspiro[2H-naphtho[1,2-b]pyran-2,3'-[3H]-naphtho[2,1-b]pyran]; 2',3-dimethyl-4-phenylspiro[2H-naphtho[1,2-b]pyran-2,3'-[3H]-naphtho[2,1-b]pyran]; 2'-3-dimethylenespiro[2H-naphtho[1,2-b]pyran-2,3'-[3H]-naphtho[2,1-b]pyran]; 2'-methyl-4-phenylspiro[2H-naphtho[1,2-b]pyran-2,3'-[3H]-naphtho[2,1-b]pyran]; 3-methyl-4-phenylspiro[2H-naphtho[1,2-b]pyran-2,3'-[3H]-naphtho[2,1-b]pyran]; 2'-phenylspiro[2H-naphtho[1,2-b]pyran-2,3'-[3H]-naphtho[2,1-b]pyran]; 3-phenylspiro[2H-naphtho[1,2-b]pyran-2,3'-[3H]-naphtho[2,1-b]pyran]; 4-phenylspiro[2H-naphtho[1,2-b]pyran-2,3'-[3H]-naphtho[2,1-b]pyran]; 2',3-trimethylenespiro[2H-naphtho[1,2-b]pyran-2,3'-[3H]-naphtho[2,1-b]pyran]; spiro[4H-napththo[1,2-b]pyran-4,3'-[3H]naphtho[2,1-b]pyran]; 3-methyl-8'-nitro-2-phenylspiro[4H-napththo[1,2-b]pyran-4,3'-[3H]naphtho[2,1-b]pyran]; spiro[2H-1-benzopyran-2,9'-xanthene]; 6,8-dinitrospiro[2H-1-benzopyran-2,9'-xanthene]; 3'-hydroxy-6-nitrospiro[2H-1-benzopyran-2,9'-xanthene]; 6-nitrospiro[2H-1-benzopyran-2,9'-xanthene]; 8-nitrospiro[2H-1-benzopyran-2,9'-xanthene]; spiro[3H- naphtho[2,1-b]pyran-3,9'-xanthene]; 2-methylspiro[3H-naphtho[2,1-b]pyran-3,9'-xanthene]; 8-nitrospiro[3H-naphtho[2,1-b]pyran-3,9'-xanthene]; spiro[3H-naphtho[2,1-b]pyran-3,2'-[2H]pyran; 4',6'-diphenylspiro[3H-naphtho[2,1-b]pyran-3,2'-[2H]pyran; spiro[indoline-2,2'-pyrano[3,2-H]quinoline]; 6'-bromo-1,3,3-trimethylspiro[indoline-2,2'-pyrano[3,2-H]quinoline]; 5-chloro-1,3,3,6'-tetramethylspiro[indoline-2,2'-pyrano[3,2-H]quinoline]; 5-chloro-1,3,3,9'-tetramethylspiro[indoline-2,2'-pyrano[3,2-H]quinoline]; 5-chloro-1,3,3-trimethylspiro[indoline-2,2'-pyrano[3,2-H]quinoline]; 3,3-dimethyl-1-ethylspiro[indoline-2,2'-pyrano[3,2-H]quinoline]; 3,3-dimethyl-1-propylspiro[indoline-2,2'-pyrano[3,2-H]quinoline]; 1-ethyl-3,3,6'-trimethylspiro[indoline-2,2'-pyrano[3,2-H]quinoline]; 5-fluoro-1,3,3,6'-tetramethylspiro[indoline-2,2'-pyrano[3,2-H]quinoline]; 5-fluoro-1,3,3-trimethylspiro[indoline-2,2'-pyrano[3,2-H]quinoline]; 1,3,3,6',7-pentamethylspiro[indoline-2,2'-pyrano[3,2-H]quinoline]; 1,3,3,7,9'-pentamethylspiro[indoline-2,2'-pyrano[3,2-H]quinoline]; 1-propyl-3,3,6'-trimethylspiro[indoline-2,2'-pyrano[3,2-H]quinoline]; 1,3,3,7-tetramethylspiro[indoline-2,2'-pyrano[3,2-H]quinoline]; 1,3,3,9'-tetramethylspiro[indoline-2,2'-pyrano[3,2-H]quinoline]; spiro[indoline-2,3'-[3H]-naphtho[2,1-b]-1,4-oxazine]; 5-chloro-1,3,3-trimethylspiro[indoline-2,3'-[3H]-naphtho[2,1-b]-1,4-oxazine]; 1,3,3-trimethylspiro[indoline-2,3'-[3H]-naphtho[2,1-b]-1,4-oxazine]; spiro[indoline-2,2'-[2H]-pyrano[3,4-b]pyridine]; 5'-hydroxymethyl-1,3,3,8'-tetramethylspiro[indoline-2,2'-[2H]-pyrano[3,4-b]pyridine]; spiro[indoline-2,2'-[2H]-pyrano[3,2-b]pyridine]; 5-chloro-1,3,3-trimethylspiro[indoline-2,2'-[3,2-H]-pyrano[3,2-b]pyridine]; spiro[indoline-2,2'-[2H]-pyrano[3,2-c]quinoline]; 1,3,3,5'-tetramethylspiro[indoline-2,2'-[2H]-pyrano[3,2-c]quinoline]; spiro[2H-1,4-benzoxazine-2,2'-indoline]; 1',3',3'-trimethylspiro[2H-1,4-benzoxazine-2,2'-indoline]; spiro[2H-1-benzopyran-2,2'-[2H]quinoline]; 6-bromo-3-isopropyl-1'-methylspiro[2H-1-benzopyran-2,2'-[2H]quinoline]; 6-bromo-1'-methylspiro[2H-1-benzopyran-2,2'-[2H]quinoline]; 3,3'-dimethylene-1'-methylspiro[2H-1-benzopyran-2,2'-[2H]quinoline]; 1'-ethylspiro[2H-1-benzopyran-2,2'-[2H]quinoline]; 1'-ethyl-6-nitrospiro[2H-1-benzopyran-2,2'-[2H]quinoline]; 1'-ethyl-8-nitrospiro[2H-1-benzopyran-2,2'-[2H]quinoline]; 6-methoxy-1'-methylspiro[2H-1-benzopyran-2,2'-[2H]quinoline]; 7-methoxy-1'-methylspiro[2H-1-benzopyran-2,2'-[2H]quinoline]; 1'-methylspiro[2H-1-benzopyran-2,2'-[2H]quinoline]; 1'-methyl-6-nitrospiro[2H-1-benzopyran-2,2'-[2H]quinoline]; 1'-methyl-3,3'-trimethylenespiro[2H-1-benzopyran-2,2'-[2H]quinoline]; 6-nitro-1',3,3'-trimethylspiro[2H-1-benzopyran-2,2'-[2H]quinoline]; spiro[3H-naphtho[2,1-b]pyran-3,2'-[2H]quinoline]; 2-isopropyl-1'-methylspiro[3H-naphtho[2,1-b]pyran-3,2'-[2H]quinoline]; 1'-methylspiro[3H-naphtho[2,1-b]pyran-3,2'-[2H]quinoline]; spiro[2H-1-benzopyran-2,2'-[2H]pyridine]; 6-bromo-1'-methylspiro[2H-1-benzopyran-2,2'-[2H]pyridine]; 1',3-dimethyl-6-nitrospiro[2H-1-benzopyran-2,2'-[2H]pyridine]; 6,8-dinitro-1'-methyl-3-phenylspiro[2H-1-benzopyran-2,2'-[2H]pyridine]; 1'-ethylspiro[2H-1-benzopyran-2,2'-[2H]pyridine]; 3-ethyl-1'-methyl-6-nitrospiro[2H-1-benzopyran-2,2'-[2H]pyridine]; 1'-ethyl-6-nitrospiro[2H-1-benzopyran-2,2'-[2H]pyridine]; 1'-ethyl-8-nitrospiro[2H-1-benzopyran-2,2'-[2H]pyridine]; 7-methoxy-1'-methylspiro[2H-1-benzopyran-2,2'-[2H]pyridine]; 1'-methylspiro[2H-1-benzopyran-2,2'-[2H]pyridine]; 1'-methyl-6-nitrospiro[2H-1-benzopyran-2,2'-[2H]pyridine]; spiro[3H-naphtho[2,1-b]pyran-3,2'-[2H]pyridine]; 1'-methylspiro[3H-naphtho[2,1-b]pyran-3,2'-[2H]pyridine]; 1',4',6'-triphenylspiro[3H-naphtho[2,1-b]pyran-3,2'-[2H]pyridine]; spiro[9H-acridine-9,2'-[2H]benzopyran]; 8'-methoxy-10-methylspiro[9H-acridine-9,2'-[2H]benzopyran]; 10-methylspiro[9H-acridine-9,2'-[2H]benzopyran]; spiro[9H-acridine-9,3'-[3H]naphtho[2,1-b]pyran]; 10-methylspiro[9H-acridine-9,3'-[3H]naphtho[2,1-b]pyran]; spiro[indoline-2,2'-[2H]pyrano[2,3-b]indole]; 5-chloro-1,3,3,9'-tetramethylspiro[indoline-2,2'-[2H]pyrano[2,3-b]indole]; spiro[indoline-2,2'-[2H]pyrano[3,2-b]indole]; 5-chloro-1,3,3-trimethylspiro[indoline-2,2'-[2H]pyrano[3,2-b]indole]; spiro[indoline-2,2'-[2H]pyrano[2,3-b]benzofuran]; 1,3,3-trimethylspiro[indoline-2,2'-[2H]pyrano[2,3-b]benzofuran]; spiro[indoline-2,2'-[2H]pyrano[3,2-b]benzofuran]; 5-chloro-1,3,3-trimethylspiro[indoline-2,2'-[2H]pyrano[3,2-b]benzofuran]; spiro[2H-1-benzothieno[2,3-b]pyran-2,2'-indoline]; 5'-chloro-1',3',3'-trimethylspiro[2H-1-benzothieno[2,3-b]pyran-2,2'-indoline]; spiro[2H]-1-benzothieno[3,2-b]pyran-2,2'-indoline]; 5'-chloro-1',3',3'-trimethylspiro[2H]-1-benzothieno[3,2-b]pyran-2,2'-indoline]; spiro[3H-naphtho[2,1-b]pyran-3,9'-thioxanthene]; 4'-chloro-8-nitrospiro[3H-naphtho[2,1-b]pyran-3,9'-thioxanthene]; spiro[2H,8H-benzo[1,2-b:-3,4-b']dipyran-8-2'-indoline]-2-one; 1',3',3',4-tetramethylspiro[2H,8H-benzo[1,2-b:-3,4-b']dipyran-8-2'-indoline]-2-one; spiro[2H-1-benzopyran-2,2'-oxazoline]; 3'-methyl-6-nitro-5'-phenylspiro[2H-1-benzopyran-2,2'-oxazoline]; spiro[2H-1-benzothiopyran-2,2'-indoline]; 1,3',3'-trimethylspiro[2H-1-benzothiopyran-2,2'-indoline]; spiro[3H-naphtho[2,1-b]pyran-3,2'-thiazoline]; 4',5'-dihydro-2,3'-dimethylspiro[3H-naphtho[2,1-b]pyran-3,2'-thiazoline]; m-dithiino[5,4b:5,6-b']bis[1]benzopyranspiro[3H-naphtho[2,1-b]pyran-3,2'-thiazoline]; 6H,8H-thiopyrano[4,3-b:4,5-b']bis[1]benzopyranspiro[3H-naphtho[2,1-b]pyran-3,2'-thiazoline]; 6H,8H-bisnaphtho[1',2':5,6]pyrano[3,2-c:2',3'-d]thiopyranspiro[3H-naphtho[2,1-b]pyran-3,2'-thiazoline]; spiro[2H-1-benzopyran-2,1'-isoindoline]; 6-nitro-2',3',3'-trimethylspiro[2H-1-benzopyran-2,1'-isoindoline]; spiro[indoline-2,3'-[3H]pyrano-[3,2-a]xanthene]-12'-one; 5-chloro-3',12'-dihydro-1,3,3-trimethylspiro[indoline-2,3'-[3H]pyrano-[3,2-a]xanthene]-12'-one; spiro[benzoselenazole-2,3'-[3H]naphtho[2,1-b]pyran]; 3-ethylspiro[benzoselenazole-2,3'-[3H]naphtho[2,1-b]pyran]; and the like. Mixtures of two or more spiro compounds can also be used.

One spiro compound preferred for lightfastness and reversibility of the photochromic shift over a number of times is of the formula

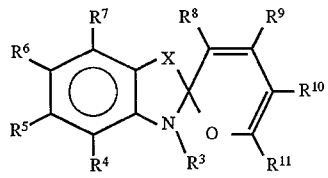

or

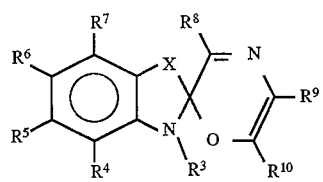

wherein X is a sulfur atom, a selenium atom, an oxygen atom, a —$CH_2$— group, a —$CHR^1$— group, or a —$CR^1R^2$— group, and wherein $R^1$, $R^2$, $R^3$, $R^4$, $R^5$, $R^6$, $R^7$, $R^8$, $R^9$, $R^{10}$, and $R^{11}$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Spiropyrans, spirooxazines, and spirothiopyrans are known compounds and can be prepared as described in, for example, U.S. Pat. No. 3,293,055; U.S. Pat. No. 3,451,338; U.S. Pat. No. 3,100,778; U.S. Pat. No. 3,290,331; U.S. Pat. No. 3,231,584; U.S. Pat. No. 3,299,079; U.S. Pat. No. 3,291,604; U.S. Pat. No. 3,149,120; U.S. Pat. No. 3,022,318; U.S. Pat. No. 2,978,462; U.S. Pat. No. 3,413,234; U.S. Pat. No. 3,407,145; French Patent 1,450,583; French Patent 1,451,332; Zelichenok et al., *Macromolecules*, vol. 25, p. 3179 et seq. (1992); A. I. Kiprianov et al., *Zh. Obshch. Khim.*, vol. 17, p. 1468 (1947); E. B. Knott, *J. Chem. Soc.*, vol. 1951, p. 3038 (1951); Y. Hirshberg et al., *J. Chem. Soc.*, vol. 1955, p. 3313 (1955); C. Schiele et al., *Tetrahedron*, vol. 23, p. 3733 (1967); T. A. Shakhverdov et al., *Opt. Spektrosk.*, vol. 24, p. 619 (1968); R. Guglielmetti et al., *J. Chim. Phys.*, vol. 65, p. 454 (1968); A. Hinnen et al., *Bull Soc. Chim. Fr.*, p. 2066 (1968); E. Berman et al., *J. Amer. Chem. Soc.*, vol. 81, p. 5605 (1959); D. P. Maisuradze et al., *Soobshch. Akad. Nauk Gruz. SSR*, vol. 50, p. 77 (1968); D. P. Maisuradze et al., *Soobshch. Akad. Nauk Gruz. SSR*, vol. 49, p. 75 (1968); T. Bercovici et al., *Mol Photochem.*, vol. 1, p. 23 (1969); O. F. Koelsch et al., *J. Amer. Chem. Soc.*, vol. 74, p. 6288 (1952); O. Chaude, *Cahiers Phys.* (France), vol. 52, p. 39 (1954); I. Shimidzu et al., *Kogyo Kagaku Zasshi*, vol. 72, p. 171 (1969); I. Shimidzu et al., *Bull. Chem. Soc. Jap.*, vol. 42, p. 1730 (1969); I. Shimidzu et al., *Nippon Kagaku Zasshi*, vol. 88, p. 1127 (1967); I. Shimidzu, et al., *Nippon Kagaku Zasshi*, vol. 89, p. 755 (1968); C. Balny et al., *Tetrahedron Lett.*, vol. 1968, p. 5097 (1968); J. Arnaud et al., *J. Chim. Phys.*, vol. 64, p. 1165 (1967); R. Wizinger et al., *Helv. Chim. Acta*, vol. 23, p. 247 (1940); L. D. Taylor et al., *Tetrahedron Lett.*, vol. 1967, p. 1585 (1967); A. I. Nogaideli et al., *Soobshch. Akad. Nauk Gruz. SSR*, vol. 40, p. 607 (1965); E. D. Bergmann et al., *J. Amer. Chem. Soc.*, vol. 7, p. 5009 (1950); C. Schiele et al., *Angew. Chem.*, vol. 78, p. 389 (1966); C. Schiele et al., *Ann. Chem.*, vol. 696, p. 81 (1966); C. Schiele et al., *Tetrahedron Lett.*, vol. 1966, p. 4409 (1966); R. Guglielmetti et al., *Bull. Soc. Chim. Fr.*, vol. 1967, p. 2824 (1967); Z. M. Elashvili et al., *Soobshch. Aka Nauk Gruz, SSR*, vol. 52, p. 351 (1968); O. Dumenil et al., *Bull. Soc. Chim. Fr.*, vol. 1969, p. 817 (1969); P. H. Vandewijer et al., *J. Polym. Sci.* Part C, vol. 22, p. 231 (1968); A. V. Shablya et al., *Opt. Spektrosk.*, vol. 20, p. 738 (1966); H. Decker et al., *Chem. Ber.*, vol. 41, p. 2997 (1908); O. Arnold, *Z. Naturforsch.*, vol. 21 b, p. 291 (1966); C. Schiele et al., *Ann. Chem.*, vol. 722, p. 162 (1969); I. M. Heilbron et al., *J. Chem. Soc.*, vol. 1931, p. 1336 (1931); A. Lowenbein et al., *Chem. Ber.*, vol. 59, p. 1377 (1926); W. Borsche et al., *Ann. Chem.*, vol. 393, p. 29 (1912); R. Dickinson et al., *J. Chem. Soc.*, vol. 1928, p. 2077 (1928); W. Dilthey et al., *J. Prakt. Chem.*, vol. 1, p. 179 (1926); R. Dickinson et al., *J. Chem. Soc.*, vol. 1927, p. 14 (1927); R. Dickinson et al., *J. Chem. Soc.*, vol. 1927, p. 1699 (1927); W. Dilthey et al., *Chem. Ber.*, vol. 61, p. 963 (1928); I. M. Heilbron et al., *J. Chem. Soc.*, vol. 1933, p. 430 (1933); I. M. Heilbron et al., *J. Chem. Soc.*, vol. 1929, p. 936 (1929); I. M. Heilbron et al., J. Chem. Soc., vol. 1936, p. 1380 (1936); C. Schiele et al., *Tetrahedron Lett.*, vol. 1966, p. 4413 (1966); I. M. Heilbron et al., *J. Chem. Soc.*, vol. 1934, p. 1571 (1934); I. M. Heilbron et al., *J. Chem. Soc.*, vol. 1933, p. 1263 (1933); F. Irving, *J. Chem. Soc.*, vol. 1929, p. 1093 (1929); F. Przystal et al., *Anal Chim. Acta*, vol. 41, p. 391 (1968); C. F. Koelsch, *J. Org. Chem.*, vol. 16, p. 1362 (1951); R. S. Becker et al., *J. Phys. Chem.*, vol. 72, p. 997 (1968); E. O. Howard et al., *J. Amer. Chem. Soc.*, vol. 82, p. 158 (1960); A. I. Nogaideli et al., *Soobshch. Akad. Nauk Gruz. SSR*, vol. 49, p. 573 (1968); A. Samat et al., *Bull. Soc., Chim. Belg.*, vol. 100, no. 9, p. 679 (1991); G. Petillon, Ph.D. Thesis, University of Brest (1979); M. Maguet, Ph.D. Thesis, University of Brest (1980); and R. Guglielmetti et al., *Bull. Soc. Chim.* France, vol 1971, p. 2039 (1971); the disclosures of each of which are totally incorporated herein by reference. Spiro compounds are also available commercially from, for example, Aldrich Chemical Company, Milwaukee, Wis., Nippon Kankoh-Shikiso Kenkyusho Co. Ltd., Okayama, Japan, Chroma Chemicals Inc., Dayton, Ohio, and the like. Specific examples of suitable commercially available spiropyrans and spirooxazines include 27,361-9; 32,254-7; 32,255-5; 32,256-3; and 32,257-1, available from Aldrich; SP-1822; SP-98; SP-48; SP-12;, and SP-99, available from Nippon Kankoh-Shikiso Kenkyusho; and the like.

Stilbene compounds are of the general formula

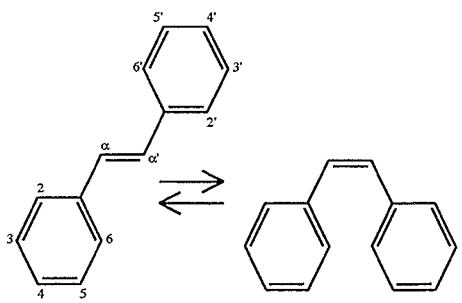

wherein substituents may be present at the 2, 3, 4, 5, 6, 2', 3', 4', 5', and 6' positions. Examples of suitable substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4'- dimethylaminostilbene, 4,4'-dinitrostilbene, 4-nitro-4'-methoxystilbene, 4-nitro-3'-methoxystilbene, 4-nitro-4'-aminostilbene, 4-nitro-4'dimethylaminostilbene, α-methylstilbene, α,α'-dimethylstilbene, α,α'-difluorostilbene, α,α'-dichlorostilbene, 2,4,6-trimethylstilbene, 2,2',4,4',6,6'-hexamethylstilbene, and the like. Stilbene compounds are well known and can be prepared as described in, for example, G. S. Hammond et al., *J. Amer. Chem. Soc.*, vol. 86, p. 3197 (1964), W. G. Herkstroeter et al., *J. Amer. Chem. Soc.*, vol. 88, p. 4769 (1966), D. L. Beveridge et al., *J. Amer. Chem. Soc.*, vol. 87, p. 5340 (1965), D. Gegiou et al., *J. Amer. Chem. Soc*, vol. 90, p. 3907 (1968), D. Schulte-Frohlinde et al., *J. Phys. Chem.*, vol. 66, p. 2486 (1962), S. Malkin et al., *J. Phys. Chem.*, vol. 68, p. 1153 (1964), S. Malkin et al., *J. Phys. Chem.*, vol. 66, p. 2482 (1964), H. Stegemeyer, *J. Phys. Chem.*, vol. 66, p. 2555 (1962), H. Gusten et al., *Tetrahedron Lett.*, vol. 1968, p. 3097 (1968), D. Gegiou et al., *J. Amen Chem.* Soc., vol. 90, p. 12 (1968), K. Kruger et al., *J. Phys. Chem.*, vol. 66, p. 293 (1969), and D. Schulte-Frohlinde, *Ann.*, vol. 612, p. 138 (1958), the disclosures of each of which are totally incorporated herein by reference.

Aromatic azo compounds which exhibit photochromism are of the general formula

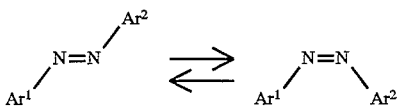

wherein $Ar^1$ and $Ar^2$ are each, independently of the other, selected from the group consisting of aromatic groups. The aromatic groups can be substituted, with examples of substituents including (but not limited to) alkyl, including cyclic alkyl groups, such as cyclopropyl, cyclohexyl, and the like, and including unsaturated alkyl groups, such as vinyl ($H_2C=CH-$), allyl ($H_2C=CH=CH_2\_$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 1 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-bromoazobenzene, 4-chloroazobenzene, 4-fluoroazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene (with any suitable anion accompanying the ammonium cation, including but not limited to, $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, $SO_3^{2-}$, $BrO_3^-$, $IO_3^-$, $ClO_3^-$, or the like, as well as mixtures thereof), 4-dimethylamino-4'-phenylazobenzene, 4-dimethylamino-4'-hydroxyazobenzene, 4,4'-bis(dimethylamino)azobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-[β-(p-aminophenyl)ethyl]azobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2'-,4',6,6'-pentamethyl-4-hydroxyazobenzene, 2,6-dimethyl-2',4',6'-trichloro-4-hydroxyazobenzene, 4-hydroxy-4'-chloroazobenzene, 2,2',4',6'-tetrachloro-4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, 4,4'-dinitroazobenzene, 4,4'-dichloroazobenzene, 2,4-dimethoxyazobenzene, 2,6-dimethoxyazobenzene, 4-nitro-4'-methoxyazobenzene, 2,4,6-trimethylazobenzene, 2,3'-dimethoxy-4'-isobutyramidoazobenzene, 2,2',4,4',6,6'-hexamethylazobenzene, 2-hydroxy-5-methylazobenzene, 3,3'-disulfonateazobenzene, 4-methoxy-3'-sulfonateazobenzene, 4-methoxy-4'-sulfonateazobenzene, 2,4-dimethoxy-4'-sulfonateazobenzene, 2,2',4-trimethoxy-5'-sulfonateazobenzene, 4,4'-dimethoxy-3,3'-dicarboxylateazobenzene, 2,2'-azopyridine, 3,3'-azopyridine, 4,4'-azopyridine, 2-phenylazopyridine, 3-phenylazopyridine, 4-phenylazopyridine, 6,6'-azoquinoline, 1-phenylazonaphthalene, 1,1-azonaphthalene, α,2'-azonaphthalene, 2,2'-azonaphthalene, 1-phenylazo-4-naphthol, 1-phenylazo-4-methoxynaphthalene, 3-phenylazo-2-naphthol, 3-phenylazo-2-methoxynaphthalene, 1-(o-hydroxyphenylazo)-2-naphthol, 4-phenylazo-1-naphthylamine, 1-phenylazo-2-naphthylamine, and the like. Polymeric azo materials are also suitable. Aromatic azo compounds are well known and can be prepared as described in, for example, A. Natansohn et al., *Macromolecules*, vol. 25, p. 2268 (1992); G. Zimmerman et al., *J. Amer. Chem. Soc.*, vol. 80, p. 3528 (1958); W. R. Brode, in *The Roger Adams Symposium*, p. 8, Wiley (New York 1955); D. Gegiou et al., *J. Amer. Chem. Soc.*, vol. 90, p. 3907 (1968); S. Malkin et al., *J. Phys. Chem.*, vol. 66, p. 2482 (1962); D. Schulte-Frohlinde, *Ann.*, vol. 612, p. 138 (1958); E. I. Stearns, *J. Opt. Soc Amer.*, vol. 32, p. 382 (1942); W. R. Brode et al., *J. Amer. Chem. Soc.*, vol 74, p. 4641 (1952); W. R. Brode et al., *J. Amer. Chem. Soc.*, vol 75, p. 1856 (1953); E. Fischer et al., *J. Chem. Phys.*, vol. 27, p. 328 (1957); G. Wettermark et al., *J. Amer. Chem. Soc.*, vol. 87, p. 476 (1965); G. Gabor et al., *J. Phys. Chem.*, vol. 72, p. 3266 (1968); M. N. Inscoe et al., *J. Amer. Chem. Soc.*, vol 81, p. 5634 (1959); E. Fischer et al., *J. Chem. Soc.*, vol. 1959, p. 3159 (1959); G. Gabor et al., *J. Phys. Chem.*, vol. 66, p. 2478 (1962); G. Gabor et al., *Israel J. Chem.*, vol. 5, p. 193 (1967); D. Bullock et al., *J. Chem. Soc.*, vol. 1965, p. 5316 (1965); R. Lovrien et al., *J. Amer. Chem. Soc.*, vol 86, p. 2315 (1964); J. H. Collins et al., *J. Amer. Chem. Soc.*, vol. 84, p. 4708 (1962); P. P. Birnbaum et al., *Trans. Faraday Soc.*, vol. 50, p. 1192 (1954); M. Frankel et al., *J. Chem. Soc.*, vol. 1955, p. 3441 (1955); E. Fischer et al., *J. Chem. Phys.*, vol. 23, p. 1367 (1955); E. Fischer, *J. Amer. Chem. Soc.*, vol. 82, p. 3249 (1960); H. Sterk et al., *Monatsch. Chem.*, vol. 99, p. 297 (1968); A. H. Cook et al., *J. Chem. Soc.*, vol. 1939, p. 1315 (1939); A. H. Cook et al., *J. Chem. Soc.*, vol. 1939, p. 1309 (1939); N. Campbell et al.,*J. Chem. Soc.*, vol. 1953, p. 1281 (1953); P. P. Birnbaum et al., *Trans. Faraday Soc.*, vol. 49, p. 735 (1953); R. Lefevre et al., *J. Chem. Soc.*, vol. 1953, p. 867 (1953); G. S. Hartley, *J. Chem. Soc.*, vol. 1938, p. 633 (1938); J. H. Gould et al., *J. Opt. Soc. Amer.*, vol. 42, p. 380 (1952); G. Gabor et al., *J. Phys. Chem.*, vol. 72, p. 153 (1968); R. Lefevre et al., *J. Chem. Soc.*, vol. 1951, p. 1814 (1951); M. A. Horowitz et al., *J. Amer. Chem. Soc.*, vol. 77, p. 5011 (1955); and A. Winkel et al., *Ber.*, vol. 74B, p. 670 (1940), the disclosures of each of which are totally incorporated herein by reference.

Bisimidazoles are of the general formula

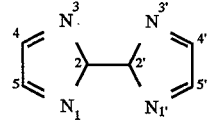

wherein substituents can be present on the 2, 4, 5, 2', 4', and 5' positions, examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Specific examples of photochromic bisimidazoles include 2,2',4,4',5,5'-hexaphenyl bisimidazole, 2,2',4,4',5,5'-hexa-p-tolyl bisimidazole, 2,2',4,4',5,5'-hexa-p-chlorophenyl bisimidazole, 2,2'-di-p-chlorophenyl-4,4',5,5'-tetraphenyl bisimidazole, 2,2'-di-p-anisyl-4,4',5,5'-tetraphenyl bisimidazole, and the like. Bisimidazole compounds are known, and can be prepared as described in, for example, T. Hayashi et al., *Bull. Chem. Soc. Jap.*, vol. 33, p. 565 (1960), T. Hayashi et al., *J. Chem. Phys.*, vol. 32, p. 1568 (1960), T. Hayashi et al., *Bull. Chem. Soc. Jap.*, vol. 38, p. 2202 (1965), and D. M. White et al., *J. Org. Chem.*, vol. 29, p. 1926 (1964), the disclosures of each of which are totally incorporated herein by reference.

Bis-tetraphenylpyrrole is of the formula

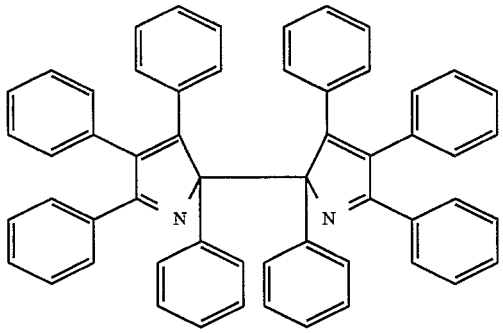

and can be prepared as disclosed in, for example, S. M. Blinder et al., *J. Chem. Phys.*, vol. 36, p. 540 (1962) and in G. Rio et al., *Acad. Sci., Paris, Set. C*, vol. 263, p. 634 (1967), the disclosures of each of which are totally incorporated herein by reference.

Hydrazines are of the general formula

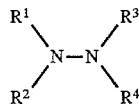

wherein $R^1$, $R^2$, $R^3$, and $R^4$ each, independently of the others, can be hydrogen, alkyl, preferably with from 1 to about 50 carbon atoms and more preferably with from 1 to about 30 carbon atoms, aryl, preferably with from about 5 to about 30 carbon atoms and more preferably with from about 5 to about 20 carbon atoms, and arylalkyl, preferably with from about 6 to about 50 carbon atoms and more preferably with from about 6 to about 30 carbon atoms. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring.

Specific examples of hydrazines include hydrazine (wherein $R^1$, $R^2$, $R^3$, and $R^4$ are each hydrogen), 1,2-diphenylhydrazine, tetraphenylhydrazine, and the like. Hydrazines are well known and can be prepared as described in, for example, G. N. Lewis et al., *J. Amer. Chem. Soc.*, vol 64, p. 2801 (1942), D. A. Ramsay, *J. Phys. Chem.*, vol. 57, p. 415 (1953), P. F. Holt et al., *J. Chem. Soc.*, v. 1955, p. 98 (1955), and J. Weiss, *Trans. Faraday Soc.*, vol. 36, p. 856 (1940), disclosures of each of which are totally incorporated herein by reference.

Aryl disulfides are of the general formula

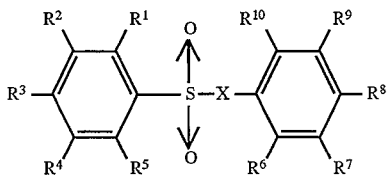

wherein X is a sulfur atom, an oxygen atom, or an $SO_2$ group and $R^1$, $R^2$, $R^3$, $R^4$, $R^5$, $R^6$, $R^7$, $R^8$, $R^9$, and $R^{10}$ each, independently of the others, can be hydrogen, alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring.

Specific examples of aryl disulfide compounds include

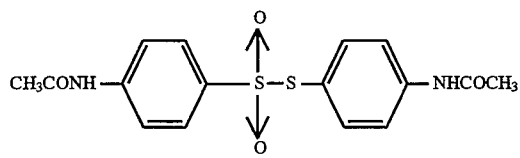

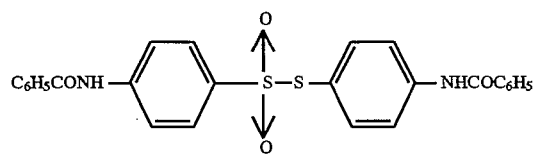

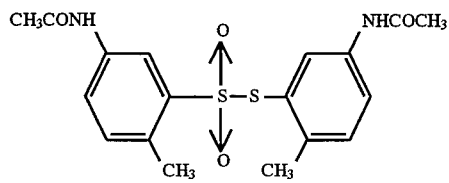

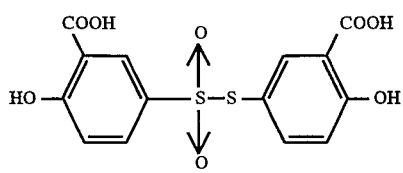

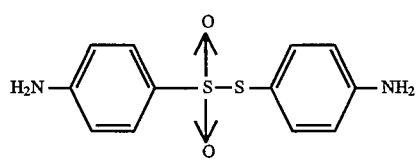

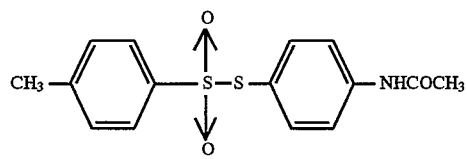

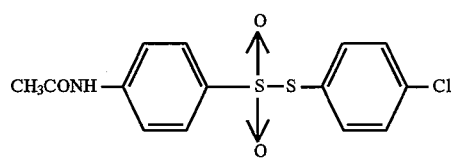

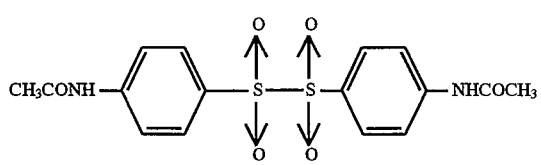

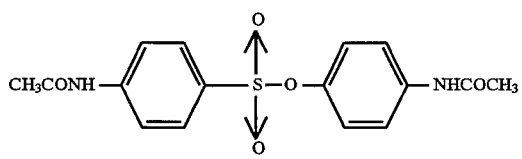

and the like. Aryl disulfide compounds are known, and can be prepared as described in, for example, C. M. Bere et al., *J. Chem. Soc.*, vol. 1924, p. 2359 (1924) and in R. Child et al., *J. Chem. Soc.*, vol. 1926, p. 2697 (1926), the disclosures of each of which are totally incorporated herein by reference.

Also suitable are compounds that exhibit tautomeric photochromic phenomena. Examples of these materials include those that undergo photochromic valence tautomerism, those that undergo hydrogen transfer, including keto-enol phototautomerism, aci-nitro phototautomerism, and those that undergo other forms of phototautomerism, such as the naphthacenequinones and their substituted derivatives, as well as polymers containing these moieties, which undergo photochromic transformation between the trans and ana forms as follows:

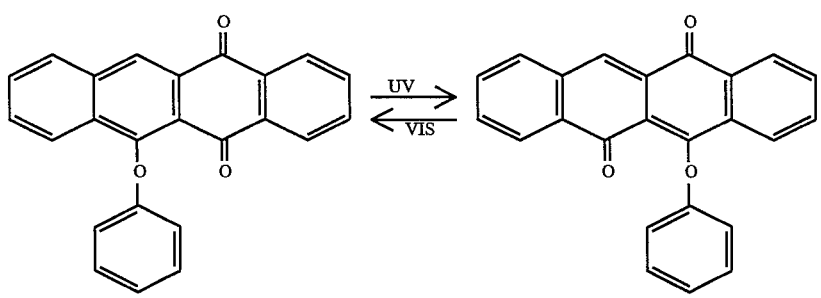

as disclosed in, for example, F. Buchholtz et al., Macromolecules, vol. 26, p. 906 (1993), the disclosure of which is totally incorporated herein by reference. Examples of suitable substituents include alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Mixtures of two or more photochromic materials can also be employed.

Additional information regarding photochromic materials and the preparation and characterization thereof is disclosed in, for example, *Techniques of Chemistry, Vol. 3: Photochromism*, A. Weissberger and G. Brown, ed., John Wiley & Sons (New York 1971), and in Photochromism: Molecules and Systems, H. Durr and H. Bouas-Laurent, ed., Elsevier (New York 1990), the disclosures of each of which are totally incorporated herein by reference. Photochromic materials are also available from, for example, Aldrich Chemical Company, Milwaukee, Wis. (including 5480-8; 13,993-9; 26,813-5; 10,655-0; 30,832-3; 5492-1; 15,073-8; 21,515-5; 12,672-1; 39,026-7; and the like), Eastman Kodak Company, Rochester, N.Y. (including 1817; 13080; 704; 9439; 11012; 902; and the like), Lancaster Synthesis Inc., Windham, N.H. (including 2002; 4555; 4956; 4364; and the like), Fluka Chemika-BioChemika, Buchs, Switzerland (including 85868; 85870; 85875; 12801; and the like) and the like.

Within the ink compositions of the present invention, the photochromic material is present in any effective amount to achieve the desired degree of coloration. Typically, the photochromic material is present in the ink in an amount of from about 0.1 to about 10 percent by weight, and preferably from about 1 to about 8 percent by weight, although the amount can be outside these ranges.

Optionally, inks of the present invention can also contain a colorant in addition to the photochromic material, such as a dye or a pigment or a mixture thereof, in any desired or effective amount.

Other additives can also be present in the inks. For example, one or more dispersing agents or surfactants or wetting agents may be added to the ink. These additives can be of the cationic, anionic, or nonionic types. Suitable surfactants, dispersing agents, and wetting agents include copolymers of naphthalene sulfonic acid salt and formaldehyde, including Daxad® 11, 11KLS, 19, 19K, and the like available from W. R. Grace & Company, the Lomar® D series available from Diamond Shamrock Corporation, vinyl aromatic salts available from Polyscience Company, Tamol® SN, Tamol® LG, the Triton® series available from Rohm and Haas Company, the Igepal® series available from GAF Company, the Tergitol® series, water compatible solvents such as ethylene glycol and the like, and other commercially available surfactants. These surfactants, dispersing agents, and wetting agents, if present, are present in any effective or desired amount, typically from about 0.01 to about 10 percent by weight of the ink, and preferably from about 0.01 to about 3 percent by weight of the ink, although the amount can be outside these ranges.

One example of an additive to the inks is a polymeric additive consisting of two polyalkylene oxide chains bound to a central bisphenol-A-type moiety. This additive is of the formula

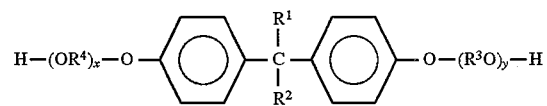

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the ink composition of the present invention include biocides, such as Dowicil 150, 200, and 75, benzoate salts, sorbate salts, and the like, typically present in an amount of from about 0.0001 to about 4 percent by weight, and preferably from about 0.01 to about 2.0 percent by weight, although the amount can be outside these ranges, humectants, such as ethylene glycol, diethylene glycol, propylene glycol, N-methylpyrrolidinone, hydroxyethers, ethers, amides, cyclic amides, sulfones, sulfoxides, ketones, lactones, esters, alcohols, and the like, typically present in an amount of from 0 to about 70 percent by weight, and preferably from about 3 to about 40 percent by weight, although the amount can be outside these ranges, antioxidants, including derivatives of phenols such as BHT, 2,6-di-t-butylphenol, and the like, tocopherol derivatives such as Vitamin E and the like, aromatic amines, alkyl and aromatic sulfides, and the like, typically present in an amount of from 0 to about 10 percent by weight, and preferably from 0 to about 5 percent by weight, although the amount can be outside these ranges, pH controlling agents, including acids such as acetic acid, phosphoric acid, boric acid, sulfuric acid, nitric acid, hydrochloric acid, and the like, bases such as potassium hydroxide, sodium hydroxide, lithium hydroxide, ammonium hydroxide, trimethylamine, ethanolamine, morpholine, triethanolamine, diethanolamine, and the like, phosphate salts, carboxylate salts, sulfite salts, amine salts, and the like, typically present in an amount of from 0 to about 10 percent by weight, and preferably from about 0.001to about 5 percent by weight, although the amount can be outside these ranges, drying accelerating agents, such as sodium lauryl sulfate, N,N-diethyl-m-toluamide, cyclohexylpyrrolidinone, butylcarbitol, and the like, typically present in an amount of from about 0.001 to about 5 percent by weight, and preferably from about 0.01 to about 3 percent by weight, although the amount can be outside these ranges, surface tension modifiers, such as sodium lauryl sulfate, sodium octyl sulfate, and the like, typically present in an amount of from 0 to about 10 percent by weight, and preferably from 0 to about 5 percent by weight, although the amount can be outside these ranges, ink penetrants, such as alcohols, sodium lauryl sulfate, esters, ketones, and the like, typically present in an amount of from about 0.001 to about 15 percent by weight, and preferably from about 0.001 to about 10 percent by weight, although the amount can be outside these ranges, and additives for improving waterfastness and lightfastness, such as polyethyleneimine, ethylene and propylene oxide modified polyethyleneimine, and the like, typically present in an amount of from 0 to about 10 percent by weight, and preferably from 0 to about 5 percent by weight, although the amount can be outside these ranges. The viscosity of the ink composition typically is from about 1 to about 10 centipoise (measured at 25° C.) and preferably is less than about 3 centipoise, although the viscosity can be outside these ranges.

Inks of the present invention can be prepared by any process suitable for preparing aqueous-based inks. For example, the ink ingredients, including the prepared liposomes, can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the pH of the ink can be adjusted if desired or necessary. Finally, the ink composition generally is filtered to remove any solid or particulate matter, preferably removing any particles greater than about 2 microns in average particle diameter. Some liposome-based inks may not be suitable for filtration processes, and in these instances large particles can be removed via centrifugation.

Printed images may be generated with the inks of the present invention by incorporating the inks into a thermal ink jet printer and causing droplets of the ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. The inks of the present invention are also suitable for use in piezoelectric drop-on-demand ink jet printing systems and in continuous stream ink jet printing systems, including those that have been modified to be capable of heating the ink. Any suitable substrate can be employed, including plain papers such as Xerox® 4024 papers, including Ashdown 4024 DP, Cortland 4024 DP, Champion 4024 DP, Xerox® 4024 D.P. green, Xerox® 4024 D.P. pink, Xerox® 4024 D.P yellow, and the like, Xerox® 4200 papers, Xerox® 10 series paper, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like, transparency materials such as Xerox® 3R3351, Tetronix ink jet transparencies, Arkright ink jet transparencies, and the like, fabrics, textile products, plastics, polymeric films, inorganic substrates such as metals and wood, and the like.

The images printed with the inks of the present invention are photochromic in that they have a first state corresponding to a first absorption spectrum and a second state corresponding to a second absorption spectrum. Another embodiment of the present invention is directed to a process which comprises (a) incorporating into an ink jet printer an ink composition which comprises an aqueous liquid vehicle, a photochromic material having a first state corresponding to a first absorption spectrum and a second state corresponding to a second absorption spectrum, and a vesicle-forming lipid, wherein vesicles of the lipid are present in the ink; (b) causing droplets of the ink to be ejected in imagewise pattern onto a substrate; and (c) thereafter effecting a photochromic change in at least some of the photochromic material on the substrate from the first state to the second state.

The photochromic shift from the first state to the second state can be effected by any method suitable for the photochromic material or materials selected for the marking material. Examples of methods for inducing the photochromic shift include irradiation with radiation of a suitable wavelength, typically from about 200 to about 400 nanometers, although the wavelength can be outside this range. The reverse photochromic effect can be induced by irradiation with visible light, typically in the wavelength range of from about 400 to about 700 nanometers, although the wavelength can be outside this range, or by the application of heat.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. Phospholipid liposomes or vesicles containing a spiropyran were prepared by first dissolving 0.05 gram of the photochrome 1',3'-dihydro-1',3',3'-trimethyl-6-nitrospiro [2H-1-benzopyran-2-2'-(2H)-indole] (hereinafter referred to as 6-nitro-BIPS, obtained from Aldrich Chemical Company, Milwaukee, Wis.) in 1 milliliter of toluene. A second solution was prepared by dissolving 0.5 gram of Proliposome H paste (obtained from Lucas-Meyer, France) as received from the manufacturer in 8.45 milliliters of deionized water. The two solutions were admixed with stirring at room temperature until all of the Proliposome H was dissolved. Thereafter, the mixture was sonicated for 1 minute (28 watts) using a Horiba sonic disruptor. The temperature of the solution during sonication increased to about 70° C., causing the solution to change color from milky white to light purple. The solution returned to its original color once the mixture cooled to room temperature. The ink thus formed was incorporated into a Hewlett-Packard DeskJet 500 thermal ink jet printer and used to print images on the wire side of Courtland Acid paper. The image thus formed was essentially invisible to the naked eye. Upon subsequent irradiation with a Blak Ray longwave UV lamp (model B-100A, San Gabriel, Calif.), the print pattern appeared bright purple. Thereafter, exposure of the print pattern to incandescent light returned the print to its original colorless appearance.

EXAMPLE II

An ink composition was prepared as follows. Phospholipid liposomes or vesicles containing a spiropyran were prepared by first dissolving 0.2 gram of 6-nitro-BIPS (obtained from Aldrich Chemical Company, Milwaukee, Wis.) in 2 milliliters of toluene. A second solution was prepared by dissolving 0.5 gram of Proliposome H paste (obtained from Lucas-Meyer, France) as received from the manufacturer in 8 milliliters of deionized water. The two solutions were admixed with stirring at room temperature until all of the Proliposome H was dissolved. Thereafter, the mixture was sonicated for 2 minutes (28 watts) using a Horiba sonic disruptor. The ink thus formed was incorporated into a Hewlett-Packard. DeskJet 500 thermal ink jet printer and used to print images on a transparency sheet having a coating containing 1 gram of silica per side. The image thus formed was essentially invisible to the naked eye. Upon subsequent irradiation with a Blak Ray longwave UV lamp (model B-100A, San Gabriel, Calif.), the print pattern appeared bright purple. Thereafter, exposure of the print pattern to incandescent light returned the print to its original colorless appearance.

Other embodiments and modifications of the present invention may occur to those skilled in the art subsequent to a review of the information presented herein. These embodiments and modifications, as well as equivalents thereof, are also included within the scope of this invention.

What is claimed is:

1. An ink composition which comprises an aqueous liquid vehicle, a photochromic material, and a vesicle-forming lipid, wherein vesicles of the lipid are present in the ink.

2. An ink composition according to claim 1 wherein the vesicle-forming lipid is a glycerophospholipid.

3. An ink composition according to claim 2 wherein the vesicle-forming lipid is selected from the group consisting of phosphatidic acids, phosphatidylethanolamines, phosphatidylcholines, phosphatidylserines, phosphatidylinositols, phosphatidylglycerols, diphosphatidylglycerols, and mixtures thereof.

4. An ink composition according to claim 1 wherein the vesicle-forming lipid is a diacylglycerole.

5. An ink composition according to claim 1 wherein the vesicle-forming lipid is a $\alpha,\omega$-dipolar diacetyle.

6. An ink composition according to claim 1 wherein the vesicle-forming lipid is present in the ink in an amount of from about 0.5 to about 20 percent by weight.

7. An ink composition according to claim 1 wherein the vesicles have an average particle diameter of less than about 500 nanometers.

8. An ink composition according to claim 1 wherein the vesicles have an average particle diameter of less than about 200 nanometers.

9. An ink composition according to claim 1 wherein the vesicles are sterically stabilized and the lipid comprises a polyalkyl ether derivative.

10. An ink composition according to claim 1 wherein the vesicles have membranes of lipid molecules, wherein at least some of the lipid molecules are bonded to other lipid molecules in the membrane by a polymerization process.

11. An ink composition according to claim 1 wherein molecules of the photochromic material are contained within the vesicles.

12. An ink composition according to claim 1 wherein the vesicles comprise at least two bilayered lipid membranes and molecules of the photochromic material are contained between the membranes.

13. An ink composition according to claim 1 wherein the vesicles comprise at least one bilayered lipid membrane and molecules of the photochromic material are contained between the layers of the membrane.

14. An ink composition according to claim 1 wherein the lipid has at least one cationic moiety and the photochromic material has at least one anionic moiety.

15. An ink composition according to claim 1 wherein the lipid has at least one anionic moiety and the photochromic material has at least one cationic moiety.

16. An ink composition according to claim 1 wherein molecules of the photochromic material are covalently bonded to molecules of the lipid.

17. An ink composition according to claim 1 wherein the photochromic material is a spiropyran.

18. An ink composition according to claim 1 wherein the photochromic material is a spirooxazine.

19. An ink composition according to claim 1 wherein the photochromic material is a spirothiopyran.

20. An ink composition according to claim 1 wherein the photochromic material is selected from the group consisting of 1',3'-dihydro-1',3',3'-trimethyl-6-nitrospiro[2H-1-benzopyran-2,2'-(2H)indole], 1,3-dihydro-1,3,3-trimethylspiro[2H-indole-2,3'-[3H]naphth[2,1-b][1,4] oxazine, and mixtures thereof.

21. A printing process which comprises incorporating into an ink jet printer an ink composition which comprises an aqueous liquid vehicle, a photochromic material, and a vesicle-forming lipid, wherein vesicles of the lipid are present in the ink, and causing droplets of the ink to be ejected in imagewise pattern onto a substrate.

22. A printing process according to claim 21 wherein the ink jet printer is a thermal ink jet printer and wherein the ink is selectively heated in an imagewise pattern, thereby causing droplets of the ink to be ejected in an imagewise pattern.

23. A printing process which comprises incorporating into an ink jet printer a first ink composition which comprises a first aqueous liquid vehicle, a first material selected from the group consisting of dyes and photochromic materials, and a first vesicle-forming lipid, wherein vesicles of the first lipid are present in the first ink, and a second ink composition which comprises a second aqueous liquid vehicle, a second material selected from the group consisting of dyes and photochromic materials, and a second vesicle-forming lipid, wherein vesicles of the second lipid are present in the second ink, causing droplets of the first ink to be ejected in imagewise pattern onto a substrate heated to a temperature above about 25° C., and subsequently causing droplets of the second ink to be ejected in imagewise pattern onto the heated substrate, wherein at least one of the first ink and the second ink contains a photochromic material.

24. A process which comprises (a) incorporating into an ink jet printer an ink composition which comprises an aqueous liquid vehicle, a photochromic material having a first state corresponding to a first absorption spectrum and a second state corresponding to a second absorption spectrum, and a vesicle-forming lipid, wherein vesicles of the lipid are present in the ink; (b) causing droplets of the ink to be ejected in imagewise pattern onto a substrate; and (c) thereafter effecting a photochromic change in at least some of the photochromic material on the substrate from the first state to the second state.

25. A process according to claim 24 wherein the photochromic change in the photochromic material from the first state to the second state is effected by irradiation with radiation at a selected wavelength.

26. A process according to claim 25 wherein said radiation is within the ultraviolet wavelength band.

27. A process according to claim 24 wherein the photochromic material in the second state subsequently is caused to undergo another photochromic change, thereby returning it to the first state.

28. A process according to claim 24 wherein the photochromic material in the second state subsequently is caused to undergo another photochromic change effected by irradiation with visible light, thereby returning it to the first state.

29. A process according to claim 24 wherein the photochromic material in the second state subsequently is caused to undergo another photochromic change effected by heating, thereby returning it to the first state.

30. A process according to claim 24 wherein all of the photochromic material on the substrate is caused to shift from the first state to the second state.

31. A method according to claim 24 wherein a first portion of the photochromic material on the substrate is caused to shift from the first state to the second state and a second portion of the photochromic material on the substrate remains in the first state.

\* \* \* \* \*